US012131711B2

(12) United States Patent
Ma

(10) Patent No.: US 12,131,711 B2
(45) Date of Patent: Oct. 29, 2024

(54) DATA PROCESSING METHOD, DATA PROCESSING DEVICE, AND DISPLAY APPARATUS WITH A BACKLIGHT MODULE USING AN OPTICAL DIFFUSION COEFFICIENT

(71) Applicant: BOE TECHNOLOGY GROUP CO., LTD., Beijing (CN)

(72) Inventor: Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/797,276

(22) PCT Filed: Jun. 9, 2021

(86) PCT No.: PCT/CN2021/099224
§ 371 (c)(1),
(2) Date: Aug. 3, 2022

(87) PCT Pub. No.: WO2022/022093
PCT Pub. Date: Feb. 3, 2022

(65) Prior Publication Data

US 2023/0059152 A1 Feb. 23, 2023

(30) Foreign Application Priority Data

Jul. 31, 2020 (CN) ......................... 202010763507.8

(51) Int. Cl.
*G09G 3/34* (2006.01)

(52) U.S. Cl.
CPC ... *G09G 3/3426* (2013.01); *G09G 2320/0233* (2013.01); *G09G 2320/0276* (2013.01);
(Continued)

(58) Field of Classification Search
CPC ... G09G 3/34–3426; G09G 3/36–3696; G09G 2320/0209; G09G 2320/0233;
(Continued)

(56) References Cited

U.S. PATENT DOCUMENTS 10,809,570 B2 10/2020 Ji et al.
2006/0238487 A1* 10/2006 Shih ...................... G09G 3/342 345/102

(Continued)

FOREIGN PATENT DOCUMENTS

CN 101620844 A 1/2010
CN 103118267 A 5/2013

(Continued)

OTHER PUBLICATIONS

Chinese First Office Action (w/ English translation) for corresponding Chinese Application No. 202010763507.8, dated Jul. 20, 2022, 13 pages.

(Continued)

*Primary Examiner* — Keith L Crawley
(74) *Attorney, Agent, or Firm* — Dority & Manning, P.A.

(57) ABSTRACT

A data processing method spoiled to a display apparatus includes, obtaining first image data including first pixel values of pixels; obtaining a brightness control value of each backlight unit according to first pixel values of pixels corresponding to the backlight unit; determining relative positional relationships between a first pixel and at least two first backlight units in a plane perpendicular to a thickness direction of the display apparatus, the first backlight units including a backlight unit corresponding to the first pixel and backlight unit(s) adjacent thereto; determining an optical diffusion coefficient of each first backlight unit at a corresponding position of the first pixel according to the relative positional relationships; and determining a backlight (Continued)

brightness characteristic value of the first pixel according to a brightness control value of each first backlight unit and the optical diffusion coefficient of each first backlight unit at the corresponding position of the first pixel.

15 Claims, 17 Drawing Sheets

(52) U.S. Cl.
CPC ............... *G09G 2320/0626* (2013.01); *G09G 2330/021* (2013.01); *G09G 2360/16* (2013.01)

(58) Field of Classification Search
CPC .... G09G 2320/0242; G09G 2320/0271–0276; G09G 2320/0285; G09G 2320/0626–0653; G09G 2330/021; G09G 2360/16; G02F 1/133601
See application file for complete search history.

(56) References Cited

U.S. PATENT DOCUMENTS

| | | | | |
|---|---|---|---|---|
| 2007/0242028 | A1 | 10/2007 | Kitagawa et al. | |
| 2009/0108761 | A1 | 4/2009 | Yeo et al. | |
| 2010/0283802 | A1* | 11/2010 | Jung | G09G 3/3426 345/102 |
| 2011/0025728 | A1* | 2/2011 | Baba | G09G 3/3426 345/102 |
| 2011/0181960 | A1 | 7/2011 | Tanijiri | |
| 2012/0105509 | A1* | 5/2012 | Ito | G09G 3/3426 345/690 |
| 2012/0139974 | A1 | 6/2012 | Sakai et al. | |
| 2013/0016036 | A1 | 1/2013 | Chang et al. | |
| 2014/0022271 | A1 | 1/2014 | Lin et al. | |
| 2014/0340437 | A1* | 11/2014 | Kohashikawa | G09G 3/3426 345/694 |
| 2016/0117993 | A1* | 4/2016 | Buckley | G09G 3/3426 345/694 |
| 2019/0221167 | A1 | 7/2019 | Lin | |
| 2019/0353961 | A1 | 11/2019 | Ji et al. | |
| 2019/0355316 | A1 | 11/2019 | Ji et al. | |
| 2020/0225537 | A1* | 7/2020 | Ji | H05B 45/10 |
| 2020/0279534 | A1* | 9/2020 | Ji | G09G 3/36 |
| 2020/0410945 | A1 | 12/2020 | Ji et al. | |
| 2021/0225299 | A1* | 7/2021 | Xi | G09G 3/3426 |
| 2021/0311361 | A1* | 10/2021 | Okamoto | G09G 5/10 |
| 2021/0390916 | A1* | 12/2021 | Shi | G09G 3/342 |

FOREIGN PATENT DOCUMENTS

| | | | |
|---|---|---|---|
| CN | 103391453 | A | 11/2013 |
| CN | 105682214 | A | 6/2016 |
| JP | H09321987 | A | 12/1997 |
| JP | 2003198842 | A | 7/2003 |
| JP | 2017154613 | A | 9/2017 |

OTHER PUBLICATIONS

PCT International Search Report (w/ English translation) and Written Opinion for corresponding PCT Application No. PCT/CN2021/099224, mailed Aug. 30, 2021, 11 pages.

Li, "Dynamic backlight control technology research and design of the LCD contrast ascension", (w/ English abstract), Ocean University of China, Master Dissertation, May 24, 2015, 78 pages.

Xitiao, "Local Dimming Algorithm for Direct-lit Type LED Backlight in LCD TVs", (w/ English abstract), Hefei University of Technology, Master Dissertation, Apr. 2015, 94 pages.

Zong, "Research on Key Techniques of Large-size LED Backlight Module with High Performance", (w/ English abstract), Huazhong University of Science & Technology, Ph.D. Dissertation, May 20, 2013, 233 pages.

* cited by examiner

400

DATA PROCESSING METHOD, DATA PROCESSING DEVICE, AND DISPLAY APPARATUS WITH A BACKLIGHT MODULE USING AN OPTICAL DIFFUSION COEFFICIENT

CROSS-REFERENCE TO RELATED APPLICATIONS

This application is a national phase entry under 35 USC 371 of International Patent Application No. PCT/CN2021/099224, filed on Jun. 9, 2021, which claims priority to Chinese Patent Application No. 202010763507.8, filed on Jul. 31, 2020, which are incorporated herein by reference in their entirety.

TECHNICAL FIELD

The present disclosure relates to the field of display technologies, and in particular, to a data processing method, data processing devices and a display apparatus.

BACKGROUND

Currently, in a large-sized and high-brightness display apparatus, for example, a direct-lit backlight module may be used to improve the brightness of the display apparatus. The direct-type backlight module generally includes a large number of light-emitting diodes (LEDs), and brightness of the backlight module may be controlled in zones by local dimming technology.

SUMMARY

In an aspect, a data processing method is provided. The data processing method is applied to a display apparatus. The display apparatus includes a display panel and a backlight module disposed opposite to each other. The display panel includes a plurality of pixels. The backlight module includes a plurality of backlight units, and each backlight unit corresponds to at least two pixels. The data processing method includes: obtaining first image data, the first image data including first pixel values of the plurality of pixels; obtaining a brightness control value of each backlight unit according to first pixel values of the pixels corresponding to the backlight unit; determining relative positional relationships between a first pixel and at least two first backlight units in a plane perpendicular to a thickness direction of the display apparatus, the relative positional relationships each including a reference distance and a reference angle, the first pixel being any pixel of the plurality of pixels, the at least two first backlight units including a backlight unit corresponding to the first pixel and at least one backlight unit adjacent thereto, and the backlight unit corresponding to the first pixel and the at least one adjacent backlight unit being arranged consecutively; determining an optical diffusion coefficient of each first backlight unit at a corresponding position of the first pixel according to the relative positional relationships; and determining a backlight brightness characteristic value of the first pixel according to a brightness control value of each first backlight unit and the optical diffusion coefficient of each first backlight unit at the corresponding position of the first pixel.

In some embodiments, the data processing method further includes: obtaining a second pixel value of the first pixel according to a first pixel value of the first pixel and the backlight brightness characteristic value of the first pixel, so as to obtain second image data including a second pixel value of each pixel.

In some embodiments, determining the relative positional relationships between the first pixel and the at least two first backlight units in the plane perpendicular to the thickness direction of the display apparatus includes: determining the reference distance, the reference distance being a distance between the corresponding position of the first pixel and a reference point of each first backlight unit; and determining the reference angle, the reference angle being an included angle between an extending direction of a line connecting the corresponding position of the first pixel with the reference point of the first backlight unit and a reference direction, and the reference direction being any direction within the plane perpendicular to the thickness direction of the display apparatus.

In some embodiments, the reference point of each first backlight unit is a center point thereof.

In some embodiments, the plurality of backlight units are arranged in an array, and the reference direction is a row direction of the first backlight units.

In some embodiments, two or more light-emitting devices are provided in each backlight unit.

In some embodiments, determining the backlight brightness characteristic value of the first pixel according to the brightness control value of each first backlight unit and the optical diffusion coefficient of each first backlight unit at the corresponding position of the first pixel includes: determining a product of the brightness control value of each first backlight unit and the optical diffusion coefficient of the first backlight unit at the corresponding position of the first pixel; and determining a sum of all products corresponding to all first backlight units to obtain the backlight brightness characteristic value of the first pixel.

In some embodiments, obtaining the first image data includes: receiving third image data; and performing gamma correction on the third image data to obtain the first image data.

In some embodiments, obtaining the second pixel value of the first pixel according to the first pixel value of the first pixel and the backlight brightness characteristic value of the first pixel includes: determining the second pixel value of the first pixel according to formula $$P_2 = P_1 \times \left(\frac{BL_{MAX}}{BL_P}\right)^{\frac{1}{\gamma}}.$$

$P_2$ is the second pixel value of the first pixel, $P_1$ is the first pixel value of the first pixel, $BL_{MAX}$ is a maximum backlight brightness driving value of the backlight unit corresponding to the first pixel, $BL_P$ is the backlight brightness characteristic value of the first pixel, and $\gamma$ is a gamma value of the gamma correction.

In some embodiments, obtaining the second pixel value of the first pixel according to the first pixel value of the first pixel and the backlight brightness characteristic value of the first pixel includes: determining the second pixel value of the first pixel according to formula $$P_2 = P_1 \times \left(\frac{N \times BL_{MAX}}{BL_P}\right)^{\frac{1}{\gamma}}.$$

$P_2$ is the second pixel value of the first pixel, $P_1$ is the first pixel value of the first pixel, $BL_{MAX}$ is a maximum backlight brightness driving value of the backlight unit corresponding to the first pixel, N is a ratio parameter, $BL_P$ is the backlight brightness characteristic value of the first pixel, and $\gamma$ is a gamma value of the gamma correction.

In some embodiments, obtaining the brightness control value of each backlight unit according to the first pixel values of the pixels corresponding to the backlight unit includes: determining J times an average pixel value of the backlight unit to obtain the brightness control value of the backlight unit, the average pixel value of the backlight unit being an average value of the first pixel values of the pixels corresponding to the backlight unit, and J being greater than or equal to 1 and less than or equal to 2 ($1 \leq J \cdot 2$).

In some embodiments, the plurality of backlight units are divided into a plurality of backlight groups; each backlight group includes at least one backlight unit; and obtaining the brightness control value of each backlight unit according to the first pixel values of the pixels corresponding to the backlight unit includes: obtaining a brightness control value of the at least one backlight unit in each backlight group in parallel according to first pixel values of at least two pixels corresponding to the at least one backlight unit in the backlight group.

In some embodiments, before determining the backlight brightness characteristic value of the first pixel, the data processing method further includes: after obtaining the brightness control value of the backlight unit, performing filtering processing on brightness control values of the plurality of backlight units.

In some embodiments, the data processing method further includes: writing the second image data into a cache; and outputting the second image data and brightness control values of the backlight units synchronously after the second image data is stored for a preset time.

In another aspect, a data processing device is provided. The data processing device is applied to a display apparatus. The data processing device includes a memory and a processor. The memory has stored therein one or more computer programs. The processor is coupled to the memory, and the processor is configured to execute the one or more computer program to cause the display apparatus to perform the data processing method according to any one of the above embodiments.

In yet another aspect, a data processing device is provided. The data processing device is a chip. The chip is configured to perform the data processing method according to any one of the above embodiments.

In yet another aspect, a display apparatus is provided. The display apparatus includes the display panel, the backlight module and the data processing device according to some embodiments described above. The backlight module is disposed opposite to the display panel. The data processing device is couple to the display panel and the backlight module. The data processing device is configured to: transmit the brightness control value of each backlight unit to the backlight module; and obtain a second pixel value of the first pixel obtained according to a first pixel value of the first pixel and the backlight brightness characteristic value of the first pixel, so as to obtain second image data including a second pixel value of each first pixel, and transmit the second image data to the display panel.

In some embodiments, the display apparatus further includes a cache. The cache is coupled to the data processing device. The cache is configured to store the second image data.

In yet another aspect, a non-transitory computer-readable storage medium is provided. The computer-readable storage medium has stored thereon computer programs that, when executed by a computer, cause the computer to perform the data processing method according to any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
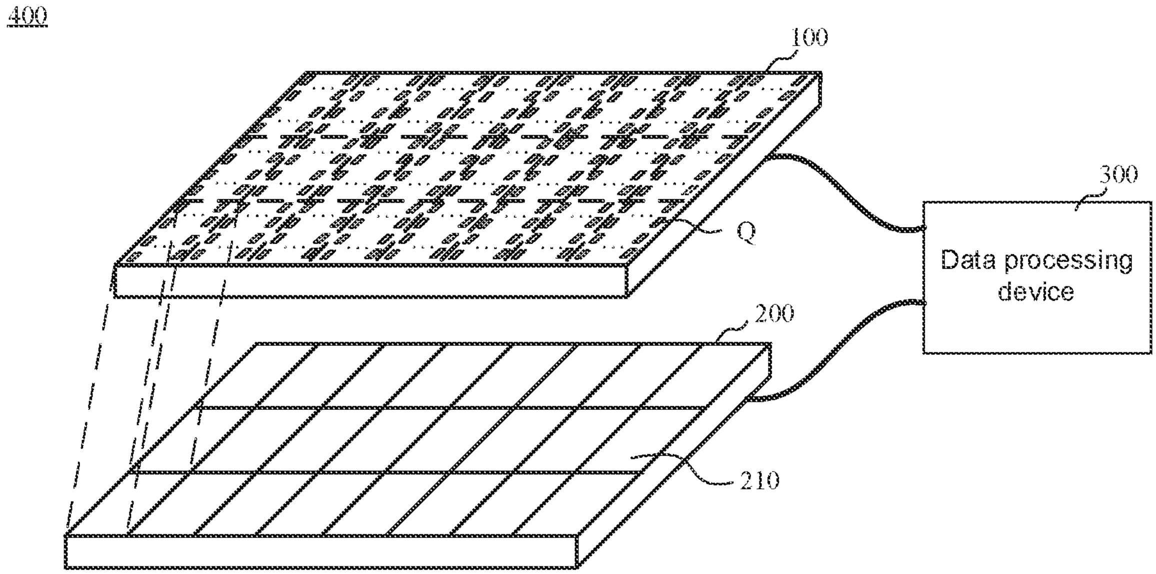
FIG. 1 is a structural diagram of a display apparatus, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, features defined as "first" and "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

In addition, the use of the phase "based on" is meant to be open and inclusive, since a process, step, calculation or other action that is "based on" one or more of the stated conditions or values may, in practice, be based on additional conditions or values exceeding those stated.

The term "substantially", "about" or "approximately" as used herein includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but including deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

For a large-sized display apparatus, a backlight module thereof has a large number of backlight zones, and in a case where a size of a light-emitting device is relatively small, the number of light-emitting devices provided in each backlight zone is relatively large (which may be, for example, 20000 or even more). In addition, in a case where the display apparatus has a relatively small thickness, an optical distance for the light-emitting devices in the backlight zone is relatively small, which may easily lead to crosstalk between light emitted by the light-emitting devices, thereby affecting a display effect of the display apparatus.

Some embodiments of the present disclosure provide a display apparatus 400 (e.g., as shown in FIG. 1). For example, the display apparatus 400 may be a display, or a product including a display, such as a television, a computer (an all-in-one computer or a desktop computer), a tablet computer, a mobile phone, or an electronic picture screen.

For example, the display apparatus 400 may have a high resolution, and may be, for example, an 8K display apparatus to display 8K-resolution images.

As shown in FIG. 1, the display apparatus 400 includes a display panel 100, a backlight module 200 and a data processing device 300. The display panel 100 and the backlight module 200 are disposed opposite to each other. For example, the data processing device 300 is coupled to the display panel 100 and the backlight module 200.

As shown in FIG. 1, the display panel 100 includes a plurality of pixels Q. For example, the display panel 100 has a resolution of 7680×4320. The backlight module 200 has a plurality of backlight units 210 (i.e., backlight zones). Each backlight unit 210 corresponds to at least two pixels Q. The plurality of pixels Q may be a part or all of pixels Q included in the display panel 100. The plurality of backlight units 210 may be a part or all of backlight units 210 included in the backlight module 200.

Figure 4:
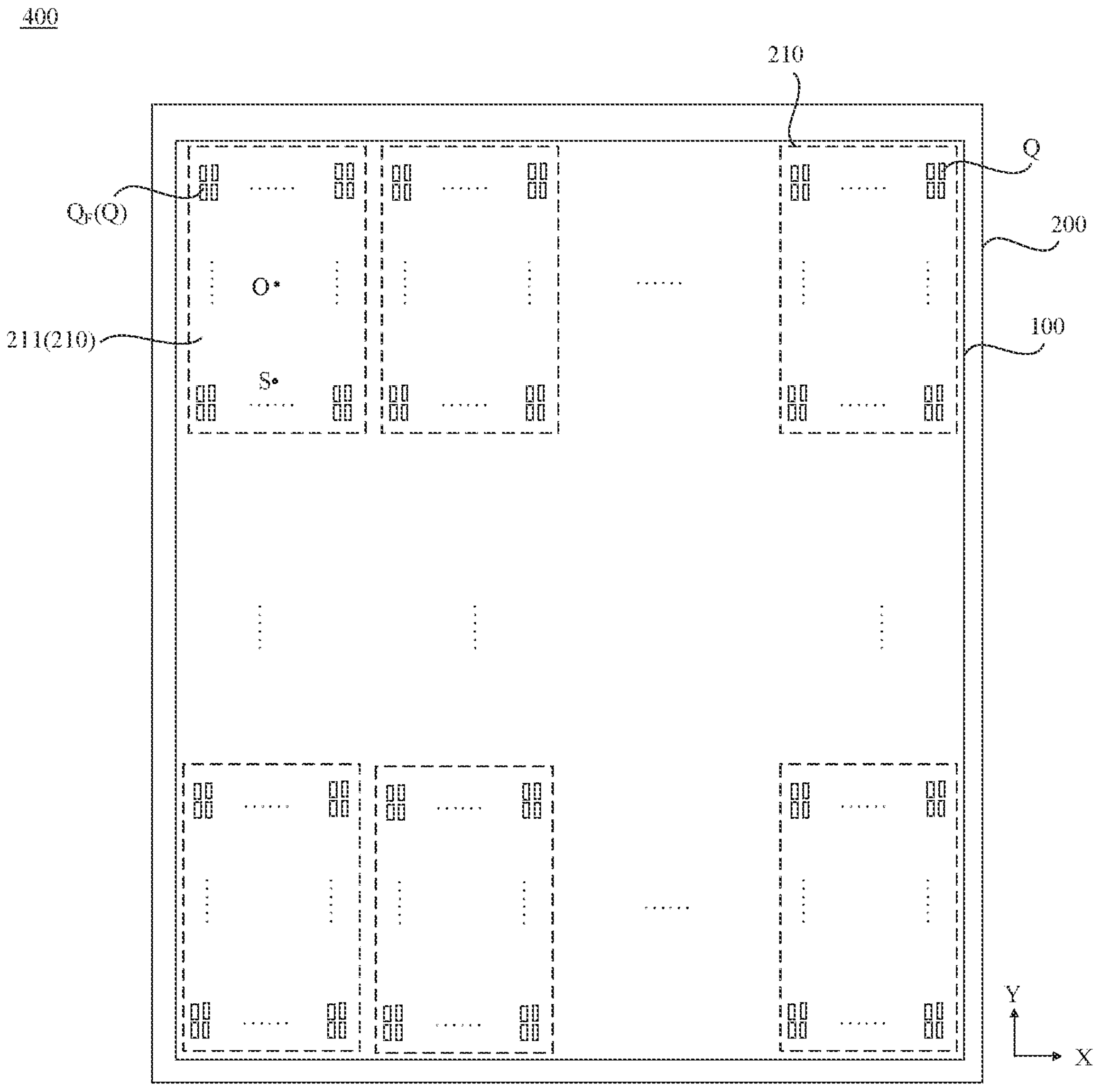
FIG. 4 is a structural diagram of yet another display apparatus, in accordance with some embodiments.

It will be noted that, an arrangement of the plurality of pixels Q in the display panel 100 is not limited in the present disclosure. For example, as shown in FIG. 4, the plurality of pixels Q may be arranged in an array. In this case, pixels arranged in a line in a horizontal direction X are referred to as pixels in a row, and pixels arranged in a line in a vertical direction Y are referred to as pixels in a column. For example, in a case where the plurality of backlight units 210 are arranged in an array, a row direction of the backlight units 210 is the horizontal direction X shown in FIG. 4, and a column direction of the backlight units 210 is the vertical direction Y shown in FIG. 4.

For example, in a case where the plurality of pixels Q are arranged in an array, in pixels Q corresponding to each backlight unit 210, the number of pixels in each row is equal to the number of pixels in each column. For example, each backlight unit 210 may correspond to 40 rows and 40 columns of pixels.

As shown in FIG. 4, each backlight unit 210 has a reference point S. In addition, relative positional relationships between reference points S of different backlight units 210 and center points O thereof are same.

It will be noted that, a position of a center point O of a backlight unit 210 refers to a position where a geometric center of the backlight unit 210 is located. For example, in a case where the backlight unit 210 has a rectangular shape, the geometric center of the backlight unit 210 is an intersection point of two diagonal lines of the rectangle; or, in a case where the backlight unit 210 has a circular shape, the geometric center of the backlight unit 210 is a center of the circle. The reference point S refers to any position of the backlight unit 210. Relative positional relationships between reference points S of different backlight units 210 and center points O thereof are same. That is, reference points S of different backlight units 210 are at a same distance from center points O thereof, and reference points S of different backlight units 210 are at a same azimuth angle (e.g., an angle between a direction pointing from 0 to S and the direction X in FIG. 4) with respect to center points O of the backlight units 210. For example, as shown in FIG. 4, the reference point S of each of the different backlight units 210 are all at an azimuth angle of 270° with respect to the center point O thereof. For example, the reference point S of each of the different backlight units 210 is located at an upper left corner thereof. For example, the reference point S of the backlight unit 210 is the center point O of the backlight unit 210. The brightness of the backlight unit 210 at the center point O of the backlight unit 210 may be maximum.

The data processing device 300 is configured to: transmit brightness control values of the backlight units 210 to the backlight module 200; and in a case where the data processing device 300 obtains second image data, and transmit the second image data to the display panel 100. In the embodiments, image data output by the data processing device 300 is referred to as the second image data.

It will be noted that, the data processing device 300 may synchronously output the brightness control values of the backlight units 210 and the second image data.

Figure 2:
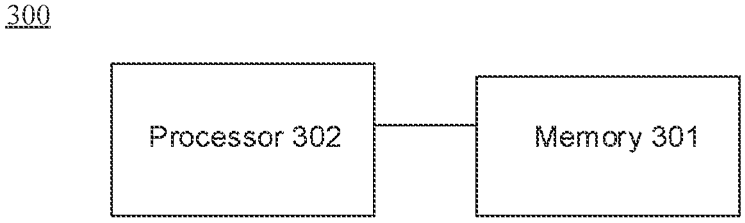
FIG. 2 is a structural diagram of a data processing device, in accordance with some embodiments.

In some embodiments, as shown in FIG. 2, the data processing device 300 includes a memory 301 and a processor 302.

The memory 301 is coupled to the processor 302.

The memory 301 stores one or more computer programs, and the one and more computer programs can be executed by the processor 302.

The computer program(s), when executed by the processor 302, cause the display apparatus 400 to perform the data processing method described in any one of the following embodiments.

For example, the processor 302 may be a single processor, or may be a general term for a plurality of processing components. For example, the processor 302 may be a general-purpose central processing unit (CPU), a microprocessor, an application specific integrated circuit (ASIC), or one or more integrated circuits (e.g., one or more microprocessors) for controlling execution of programs of the solutions of the present disclosure.

The memory 301 may be a single memory, or a general term for a plurality of storage components, and is used to store executable program code and the like. Moreover, the memory 301 may be a random access memory (RAM), or a non-volatile memory such as a disk memory or a flash memory.

The memory 301 is used to store application code for execution of the solutions of the present disclosure, and the execution is controlled by the processor 320. The processor 302 is used to execute the application code stored in the memory 301, so as to control the display apparatus 400 to perform the data processing method provided in any one of the following embodiments of the present disclosure.

In some other embodiments, the data processing device 300 may be a chip. The chip is configured to perform the data processing method in any one of the following embodiments.

For example, the chip may be a programmable device, such as a complex programmable logic device (CPLD), an erasable programmable logic device (EPLD) or a field-programmable gate array (FPGA).

Figure 3:
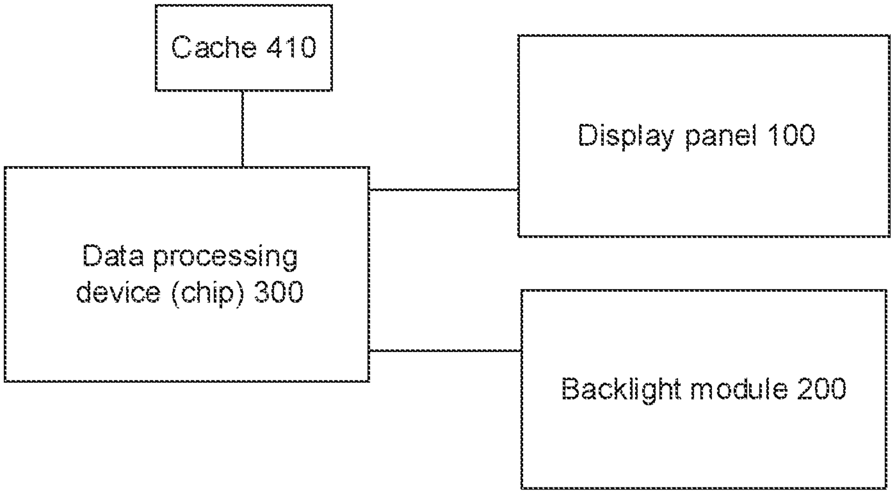
FIG. 3 is a structural diagram of another display apparatus, in accordance with some embodiments.

In some embodiments, as shown in FIG. 3, the display apparatus 400 further includes a cache 410. The cache 410 is coupled to the data processing device 300. The cache 410 is configured to store the second image data in the case where the data processing device 300 obtains the second image data. For example, the cache 410 may be located in the memory 301 of the data processing device 300. That is, the memory 301 may include the cache 410.

For example, the cache 410 may be a random access memory (RAM) or a double data rate synchronous dynamic random access memory (DDR SRAM).

The display apparatus 400 further includes a driver integrated circuit (IC) and a timing controller (T-CON). The driver IC is bonded to the display panel 100, and the driver IC is coupled to the timing controller. In this case, the data processing device 300 transmits the second image data to the timing controller; then, the timing controller outputs a timing control signal to the driver IC, and then the driver IC outputs a driving signal to the display panel 100 according to the timing control signal, so as to drive the display panel 100 to display an image.

The backlight module 200 includes a lamp panel, which is provided with a plurality of light-emitting devices and a backlight control circuit coupled to the plurality of light-emitting devices. In this case, the data processing device 300 transmits the brightness control values of the backlight units 210 to the backlight control circuit; then, the backlight control circuit converts the brightness control values into corresponding backlight control signals (e.g., pulse-width modulation (PWM) signals), and transmits a corresponding backlight control signal to light-emitting devices in each backlight unit 210, so as to control the plurality of light-emitting devices to emit light.

The backlight module 200 adopts local dynamic dimming technology.

Figure 12:
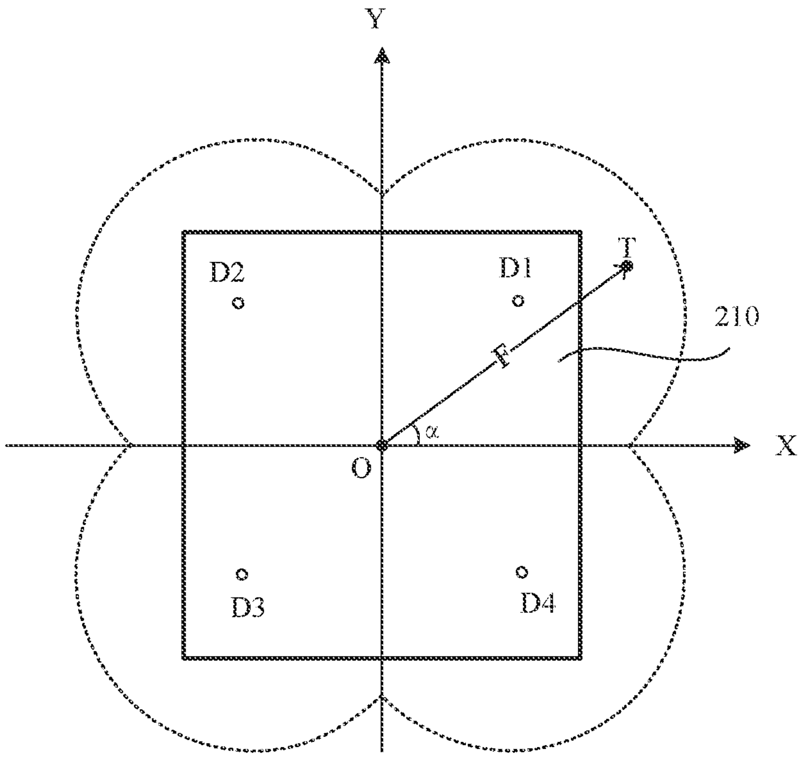
FIG. 12 is a diagram illustrating a process of obtaining an optical diffusion coefficient of a backlight unit, in accordance with some embodiments.

It will be noted that, the number of the light-emitting devices provided in the backlight unit is not limited in the embodiments of the present disclosure, and may be designed according to actual situations. For example, as shown in FIG. 12, two or more light-emitting devices D (e.g., four light-emitting devices D1 to D4) are provided in the backlight unit 210, and at least two light-emitting devices are uniformly distributed in the backlight unit 210.

For example, the light-emitting device may be an inorganic light-emitting device such as a micro light-emitting diode (micro LED) or a mini light-emitting diode (mini LED).

Figure 5:
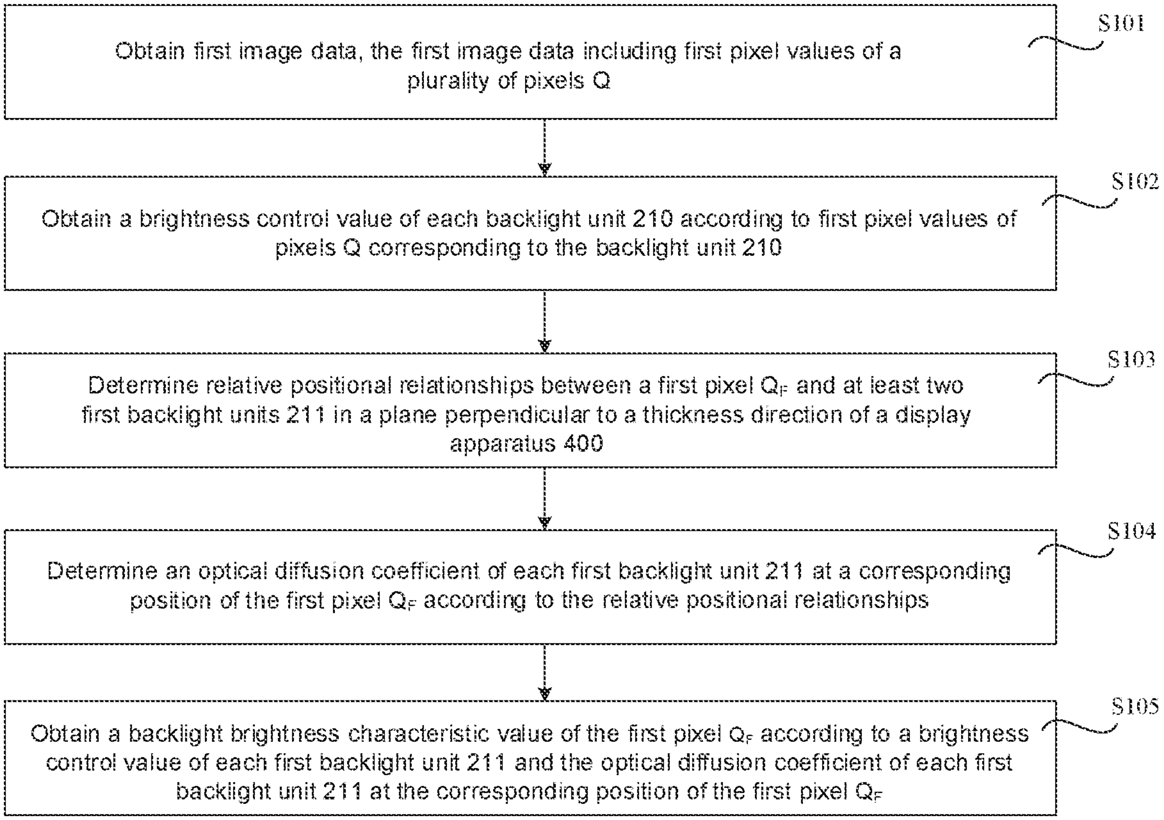
FIG. 5 is a flow diagram of a data processing method, in accordance with some embodiments.

Some embodiments of the present disclosure provide a data processing method, which is applied to the display apparatus 400. An execution subject of the data processing method may be the display apparatus 400, or may be certain component(s) in the display apparatus, such as the data processing device 300. As shown in FIG. 5, the data processing method includes the following steps.

In S101, first image data is obtained, the first image data including first pixel values of the plurality of pixels Q.

It can be understood that each pixel Q includes sub-pixels. For example, the sub-pixels include a red sub-pixel, a green sub-pixel, and a blue sub-pixel. In this case, the first image data includes gray levels of the sub-pixels in each pixel Q.

For example, a first pixel value of a pixel Q may be obtained according to gray levels of sub-pixels in the pixel Q. For example, according to a gray level R of a red sub-pixel, a gray level G of a green sub-pixel, and a gray level B of a blue sub-pixel in the pixel Q, RGB data is converted into YUV data. With the BT.709 standard as an example, a brightness Y' of the pixel Q may be obtained according to the following formula: $Y'=0.2126\times R+0.7152\times G+0.0722\times B$. In this case, the brightness Y' of the pixel Q may be regarded as the first pixel value of the pixel Q. The standard for converting the RGB data into the YUV data is not limited in the embodiments of the present disclosure, and may be selected according to actual situations.

Figure 6:
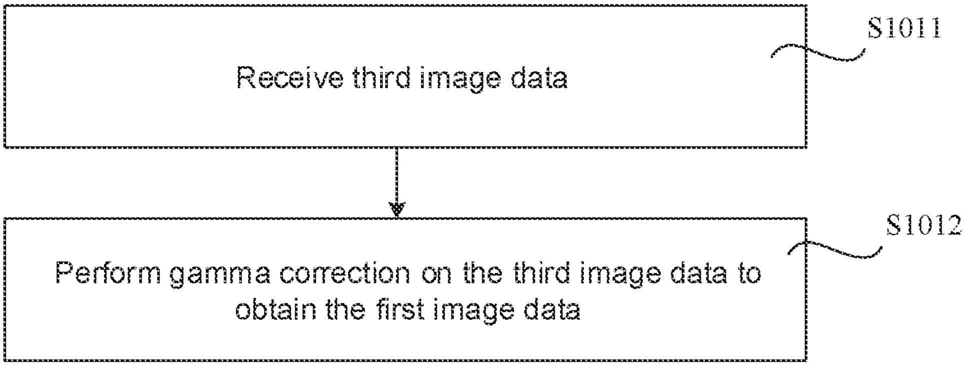
FIG. 6 is a flow diagram of another data processing method, in accordance with some embodiments.

For example, obtaining the first image data, as shown in FIG. 6, includes the following steps.

In S1011, third image data is received.

The third image data may be original image data input through a video signal interface of the display apparatus 400. For example, the video signal interface may be a low voltage differential signaling (LVDS) interface, a high-definition multimedia interface (HDMI) or the like.

In S1012, gamma correction is performed on the third image data to obtain the first image data.

It will be noted that, the gamma correction is based on visual characteristics of human eyes.

It can be understood that a gamma curve is a standard curve, which reflects correspondence between a gray level and a brightness. According to a maximum display brightness of the display apparatus 400 and the gamma curve, a brightness corresponding to each gray level is determined, and gamma correction is performed on a gray level of each sub-pixel of each pixel Q in the third image data, thereby obtaining a gray level of each sub-pixel of each pixel Q in the first image data. For example, in a case where a gamma value of the gamma correction is γ (e.g., γ being equal to 2.4 (γ=2.4)), (1/γ)th power conversion may be performed on the gray level of each sub-pixel in each pixel Q included in the third image data, thereby obtaining the first image data. In this case, the first image data is more in line with the visual characteristics of the human eyes than the third image data, thereby improving image viewing effect.

In S102, a brightness control value of each backlight unit 210 is obtained according to first pixel values of pixels Q corresponding to the backlight unit 210.

Figure 7:
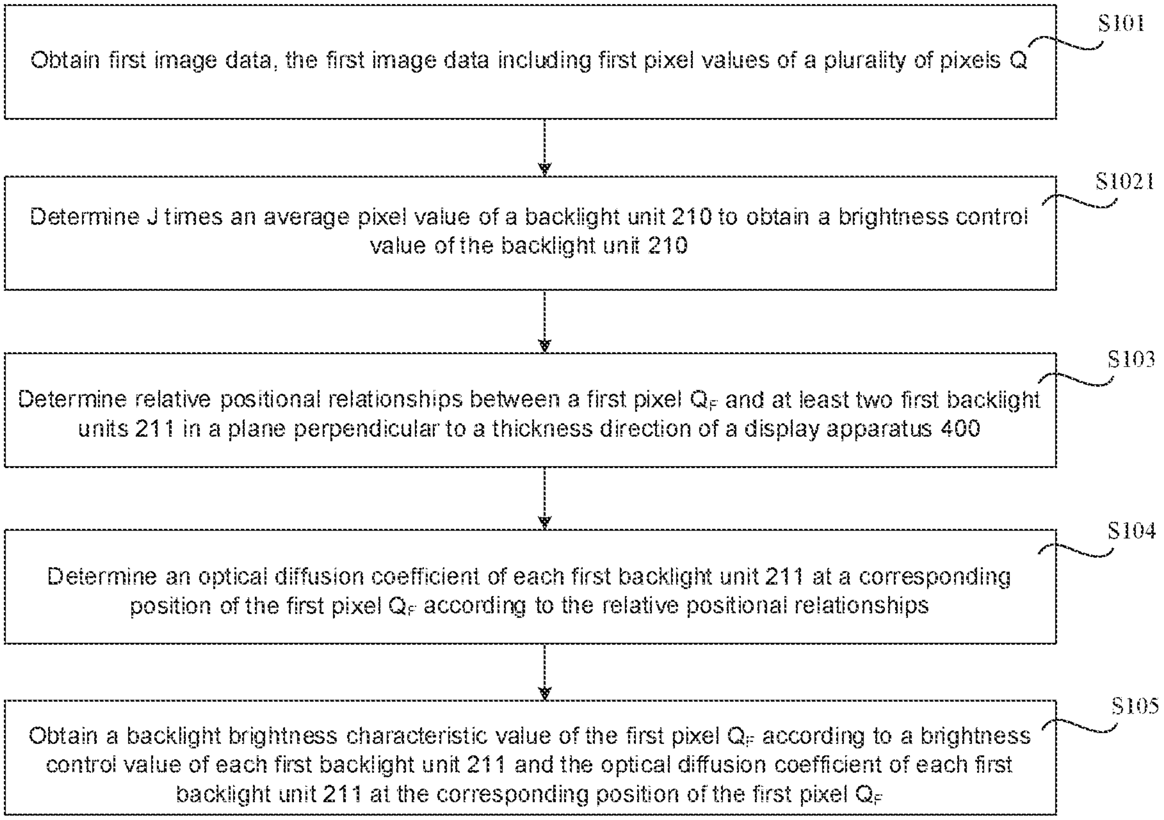
FIG. 7 is a flow diagram of yet another data processing method, in accordance with some embodiments.

For example, obtaining the brightness control value of each backlight unit 210 according to the first pixel values of the pixels Q corresponding to the backlight unit 210, as shown in FIG. 7, includes the following steps.

In S1021, J times an average pixel value of the backlight unit 210 is determined to obtain the brightness control value of the backlight unit 210.

The average pixel value of the backlight unit 210 is an average value of the first pixel values of the pixels Q corresponding to the backlight unit 210, and J is greater than or equal to 1 and less than or equal to 2 ($1\leq J\leq 2$). For example, J may be 1.5.

It will be noted that, the brightness control value of the backlight unit 210 may be a unitless value, and a magnitude of the value represents only a magnitude of a relative brightness of the backlight unit 210. The brightness control value of the backlight unit 210 may be used to control a magnitude of a driving current. That is, the brightness control value may be regarded as a backlight driving value. The backlight driving value is in a linear relationship with the driving current, and the driving current is in an approximately linear relationship with the brightness, and the magnitude of the driving current represents the magnitude of the relative brightness of the backlight unit 210. For example, a chip may convert the backlight driving value into the driving current according to the following formulas: $I_{OUT,ICG}=I_{OUT,GCG}\times(\text{Code}/127)$, $I_{OUT,GCG}=(1/\text{REXT})\times 0.600\times \text{Gain1}\times \text{Gain2}$, Gain1=GCG[A:9], and Gain2=((GCG[8:6])/6.944+1). Here, REXT is an external resistance of the chip, GCG[A:9] and GCG[8:6]) are both preset register values, Code is the backlight driving value, and $I_{OUT,ICG}$ is the driving current. Of course, different standards may be adopted for conversion in the present disclosure, which are not limited here. Alternatively, the backlight control value of the backlight unit 210 may be an actual brightness of the backlight unit 210.

For example, a relationship between a brightness control value (i.e., a backlight driving value) $BL_V$ of the backlight unit 210 corresponding to a certain brightness (e.g., Y'=P) of the backlight unit 210, and a backlight driving value $BL_{V\_MAX}$ of the backlight unit corresponding to a maximum brightness (e.g., Y'=255) of light emitted by the display apparatus 400 is $BL_V=(P/255)\times BL_{V\_MAX}$. The backlight driving value corresponding to the maximum brightness of the display apparatus 400 may be a backlight driving value corresponding to the maximum brightness (e.g., 1000 nit) of the light emitted by the display apparatus 400 obtained by adjusting brightness of each backlight unit 210 in a case where a maximum value of the brightness Y' is 255.

It will be noted that, a method for determining the average pixel value of the backlight unit 210 may be selected according to actual situations, which is not limited herein. For example, in a case where each backlight unit 210 corresponds to 1600 pixels Q, and the 1600 pixels Q are arranged in an array of 40 rows and 40 columns, a sum of first pixel values of 40 pixels Q in each row may be counted, and then the counted results of the 40 rows are added in sequence to obtain a sum (SUM) of first pixel values of the 1600 pixels Q. Then, by determining J times an average of the sum (SUM) of the first pixel values of the 1600 pixels Q, the average pixel value (P(value)) of the backlight unit 210 may be obtained according to the following formula: $P(\text{value})=J\times \text{SUM}/1600$.

In this case, for example, for a maximum first pixel value in the first pixel values of the pixels Q corresponding to the backlight unit 210, a backlight driving value (e.g., a driving current or a driving voltage) of a pixel Q corresponding to the maximum first pixel value may be reduced. Thus, in a case of ensuring that a display brightness value remains unchanged, a gray level of the pixel Q corresponding to the maximum first pixel value needs to be increased. In this case, if J is less than 1 (J<1), a range of decrease in the backlight driving value of the pixel Q corresponding to the maximum first pixel value is large, and correspondingly, a range of increase in the gray level of the pixel Q corresponding to the maximum first pixel value is also large. As a result, the gray level of the pixel Q corresponding to the maximum first pixel value is easy to exceed a maximum gray level of the display apparatus 400, which in turn results in pixel overflow. Therefore, in a case where J is greater than or equal to 1 and less than or equal to 2 ($1 \le J \le 2$), a range of decrease in the backlight driving value of the pixel Q corresponding to the maximum first pixel value is small, and correspondingly, a range of increase in the gray level of the pixel Q corresponding to the maximum first pixel value is also small. As a result, it is possible to prevent the gray level of the pixel Q corresponding to the maximum first pixel value from exceeding the maximum gray level of the display apparatus 400, and in turn, a pixel overflow probability may be reduced. Moreover, since the backlight driving value of the pixel Q corresponding to the backlight unit 210 is reduced, a power consumption of the backlight module 200 may be reduced.

Figure 8:
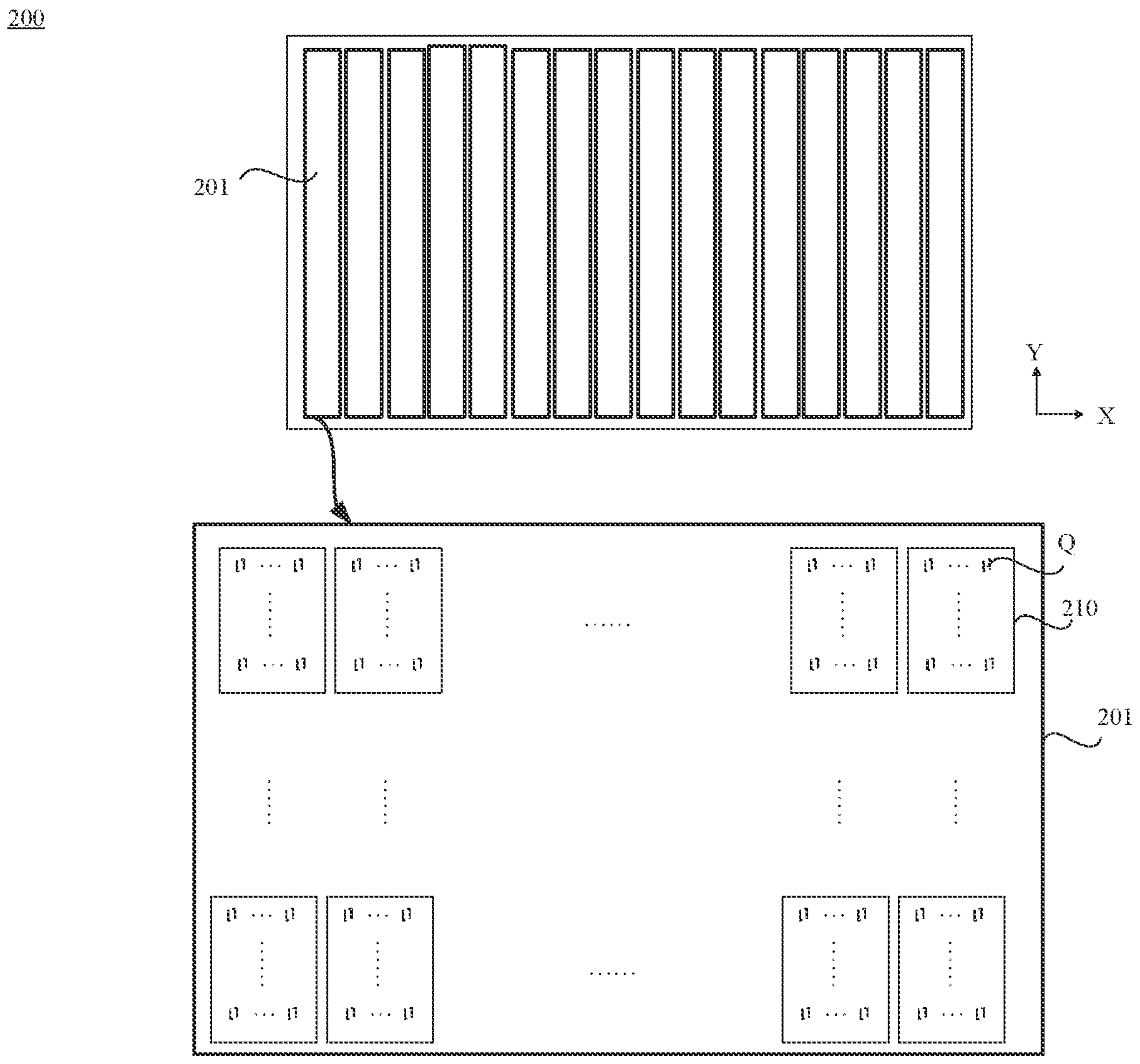
FIG. 8 is a structural diagram of a backlight module, in accordance with some embodiments.

For example, as shown in FIG. 8, the plurality of backlight units 210 are divided into a plurality of backlight groups 201, and each backlight group 201 includes at least one backlight unit 210.

Figure 9:
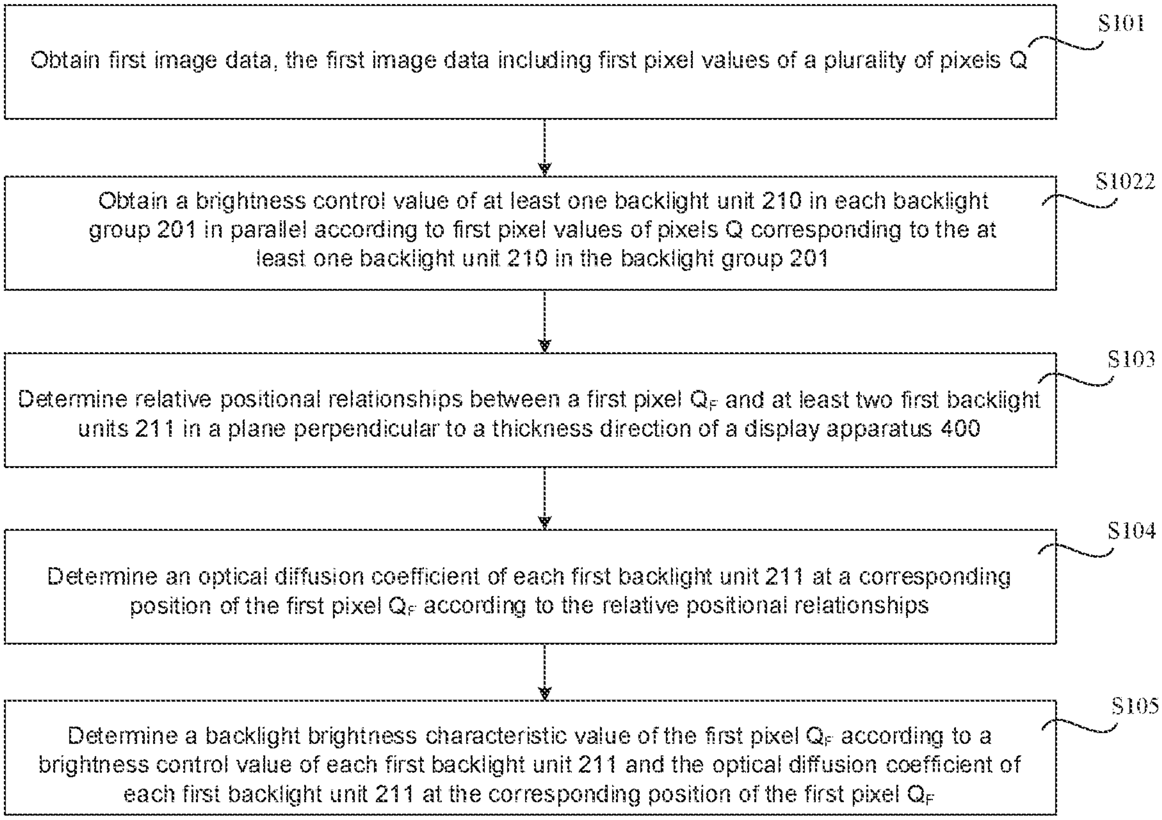
FIG. 9 is a flow diagram of yet another data processing method, in accordance with some embodiments.

In this case, obtaining the brightness control value of each backlight unit 210 according to the first pixel values of the pixels Q corresponding to the backlight unit 210, as shown in FIG. 9, includes the following steps.

In S1022, a brightness control value of at least one backlight unit 210 in each backlight group 201 is obtained in parallel according to first pixel values of pixels Q corresponding to the at least one backlight unit 210 in the backlight group 201.

For example, in a case where the display apparatus 400 has a resolution of 7680×4320, referring to FIG. 8, the plurality of backlight units 210 may be divided into 16 backlight groups 201, each backlight group 201 includes (12×108) backlight units 210, and each backlight unit 210 corresponds to (40×40) pixels Q. The 16 backlight groups 210 are arranged along a row direction of the pixels. Backlight units 210 in each backlight group 201 are arranged in an array of 108 rows and 12 columns. In addition, (40×40) pixels Q corresponding to each backlight unit 210 are arranged in an array of 40 rows and 40 columns. In this case, brightness control values of the (12×108) backlight units 210 in each of the 16 backlight groups 201 are obtained in parallel. In this case, time for determining the brightness control values of the backlight units 210 may be shortened, thereby improving data processing efficiency.

It will be noted that, a method for obtaining brightness control values of the backlight units 210 in each backlight group 201 in parallel may be selected according to actual situations, which is not limited herein. For example, average pixel values of the backlight units 210 in each backlight group 201 may be determined in parallel, and then the brightness control values of the backlight units 210 in each backlight group 201 may be obtained in parallel.

In S103, relative positional relationships between a first pixel $Q_F$ and at least two first backlight units 211 in a plane perpendicular to a thickness direction of the display apparatus 400 (i.e., a plane in which the horizontal direction X and the vertical direction Y are located shown in FIG. 4) are determined.

The relative positional relationships each include a reference distance and a reference angle. Referring to FIG. 4, the first pixel $Q_F$ is any pixel Q, and the at least two first backlight units 211 include a backlight unit 210 corresponding to the first pixel $Q_F$ and at least one backlight unit 210 adjacent thereto, and the backlight unit 210 corresponding to the first pixel $Q_F$ and the at least one backlight unit 210 adjacent thereto are arranged consecutively.

Figure 10A:
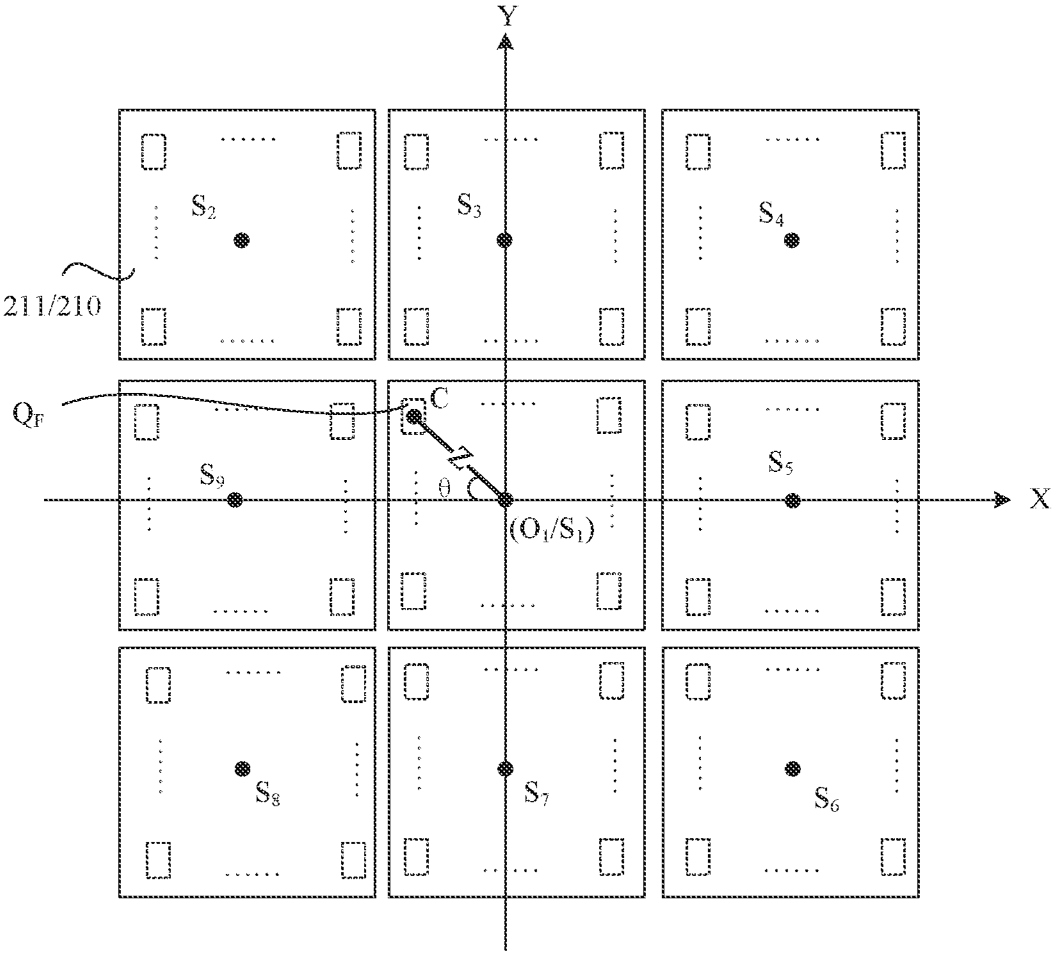
FIG. 10A is a diagram illustrating a process of determining relative positional relationships between a first pixel and reference points of at least two first backlight units, in accordance with some embodiments.

For example, in the case where the plurality of backlight units 210 are arranged in an array, the backlight unit 210 corresponding to the first pixel $Q_F$ and the at least one backlight unit 210 adjacent thereto are arranged in an array of H rows and K columns, and H and K are both positive integers. For example, the backlight unit 210 corresponding to the first pixel $Q_F$ and the at least one backlight unit 210 adjacent thereto are arranged in an array of 5 rows and 5 columns, and the backlight unit 210 corresponding to the first pixel $Q_F$ may be located at a center of the array of 5 rows and 5 columns. Alternatively, for example, as shown in FIG. 10A, the at least two first backlight units 211 include the backlight unit 210 corresponding to the first pixel $Q_F$ and eight backlight units 210 adjacent thereto. In this case, the backlight unit 210 corresponding to the first pixel $Q_F$ and the eight backlight units 210 adjacent thereto are arranged in an array of 3 rows and 3 columns (i.e., H=3, and K=3), and the backlight unit 210 corresponding to the first pixel $Q_F$ may be located at a center of the array of 3 rows and 3 columns.

Figure 18:
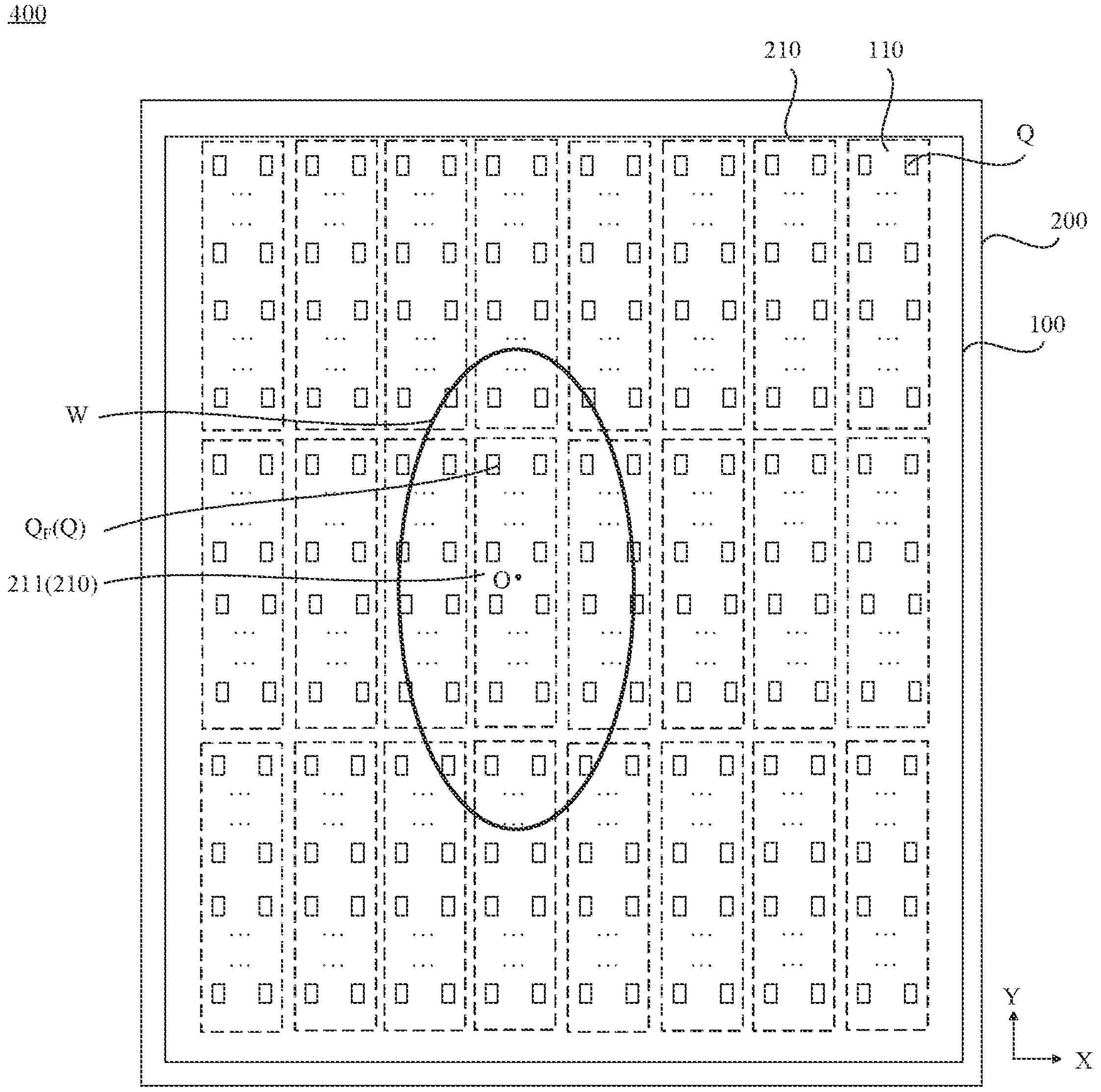
FIG. 18 is a structural diagram of yet another display apparatus, in accordance with some embodiments.

For example, as shown in FIG. 18, the at least two first backlight units 211 overlap with a brightness diffusion region W. A brightness value at each position at a border of the brightness diffusion region W is equal to or substantially equal to 10% of a brightness value at a center point of the backlight unit 210 corresponding to the first pixel $Q_F$.

For example, in FIG. 18, the brightness diffusion region W overlaps with the backlight unit 210 corresponding to the first pixel $Q_F$ and the eight adjacent backlight units 210, so that the at least two first backlight units 211 include the backlight unit 210 corresponding to the first pixel $Q_F$ and the eight adjacent backlight units 210.

It will be noted that, based on the optical diffusion law, the backlight unit 210 corresponding to the first pixel $Q_F$ has a maximum brightness value at the center point thereof, and brightness values thereof gradually decay from a center to a periphery. A brightness value at each position in each backlight unit 210 that does not overlap with the brightness diffusion region W is relatively small, and has a relatively small effect on the first pixel $Q_F$, which may be ignored. Consequently, in a subsequent process of determining a backlight brightness characteristic value of the first pixel $Q_F$, an amount of calculation may be reduced and calculation time may be shortened, and in turn, calculation efficiency may be improved.

For example, in a case where a brightness value of a backlight unit 210, except the backlight unit 210 corresponding to the first pixel $Q_F$, at a position of the first pixel $Q_F$ is greater than or equal to 10% of a brightness value at a center point of the backlight unit 210, the backlight unit 210 may be regarded as a backlight unit 210 adjacent to the backlight unit 210 corresponding to the first pixel $Q_F$.

Figure 11:
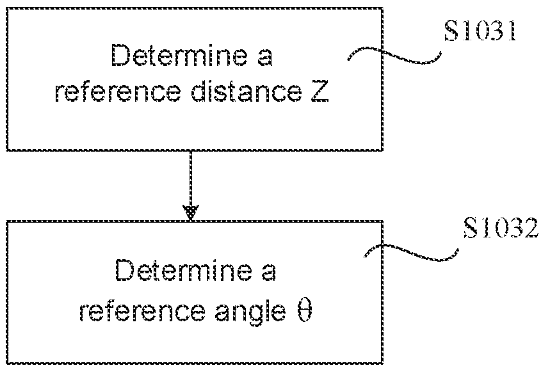
FIG. 11 is a flow diagram of yet another data processing method, in accordance with some embodiments.

For example, determining the relative positional relationships between the first pixel $Q_F$ and the at least two first backlight units 211 in the plane perpendicular to the thickness direction of the display apparatus 400, as shown in FIG. 11, includes the following steps.

In S1031, the reference distance Z is determined. Referring to FIG. 10A, the reference distance Z is a distance between a corresponding position of the first pixel $Q_F$ and a reference point S of each first backlight unit 211.

In S1032, the reference angle 9 is determined. Referring to FIG. 10A, the reference angle θ is an included angle between an extending direction of a line connecting the corresponding position of the first pixel $Q_F$ with the reference point S of each first backlight unit 211 and a reference direction, and the reference direction is any direction within the plane perpendicular to the thickness direction of the display apparatus 400.

It will be noted that, the reference direction may be selected according to actual situations, which is not limited herein. For example, in the case where the plurality of backlight units 210 are arranged in an array, the reference direction may be a row direction of the first backlight units 211 (i.e., the horizontal direction X shown in FIG. 10A), or may be a column direction of the first backlight units 211 (i.e., the vertical direction Y shown in FIG. 10A).

For example, as shown in FIG. 10A, in the array of 3 rows and 3 columns formed by the backlight unit 210 corresponding to the first pixel $Q_F$ and the eight adjacent backlight units 210, the backlight unit 210 corresponding to the first pixel $Q_F$ is a first backlight unit, and the eight adjacent backlight units 210 are a second backlight unit to a ninth backlight unit. In a case where the reference point S of the backlight unit 210 is the center point O of the backlight unit 210, a coordinate system is established with a center point $O_1$ of the first backlight unit as a coordinate origin, the row direction of the backlight units 210 as a horizontal axis, and the column direction of the backlight units 210 as a vertical axis. In the coordinate system, coordinates of the reference point $S_1$ (i.e., the center point $O_1$) of the first backlight unit are (0, 0); coordinates of the reference point $S_2$ of the second backlight unit are ($X_{S2}$, $Y_{S2}$); coordinates of the reference point $S_3$ of the third backlight unit are ($X_{S3}$, $Y_{S3}$); coordinates of the reference point $S_4$ of the fourth backlight unit are ($X_{S4}$, $Y_{S4}$); coordinates of the reference point $S_5$ of the fifth backlight unit are ($X_{S5}$, $Y_{S5}$); coordinates of the reference point $S_6$ of the sixth backlight unit are ($X_{S6}$, $Y_{S6}$); coordinates of the reference point $S_7$ of the seventh backlight unit are ($X_{S7}$, $Y_{S7}$); coordinates of the reference point $S_8$ of the eighth backlight unit are ($X_{S5}$, $Y_{S5}$); coordinates of the reference point $S_9$ of the ninth backlight unit are ($X_{S9}$, $Y_{S9}$); and coordinates of the position C where the first pixel $Q_F$ is orthogonally projected onto the backlight module 200 are ($X_C$, $Y_C$).

In this case, according to formula $Z=V(X_S-X_C)^2+Y_S-Y_C)^2$ and formula $$\theta = \arctan\left(\frac{|Y_S - Y_C|}{|X_S - X_C|}\right),$$

a reference distance Z between the corresponding position C of the first pixel $Q_F$ and each of the backlight unit 210 corresponding to the first pixel $Q_F$ and the eight adjacent backlight units 210 is determined, and a reference angle θ between the corresponding position C of the first pixel $Q_F$ and each of the backlight unit 210 corresponding to the first pixel $Q_F$ and the eight adjacent backlight units 210 is determined. That is, a relative positional relationship between the first pixel $Q_F$ and each of the reference points S of the backlight unit 210 corresponding to the first pixel $Q_F$ and the eight adjacent backlight units 210 is obtained, and the relative positional relationship includes the reference distance Z and the reference angle G.

It will be noted that, a method for establishing the coordinate system in a process of determining the reference distances Z and the reference angles θ may be selected according to actual situations, which is not limited herein.

Figure 10B:
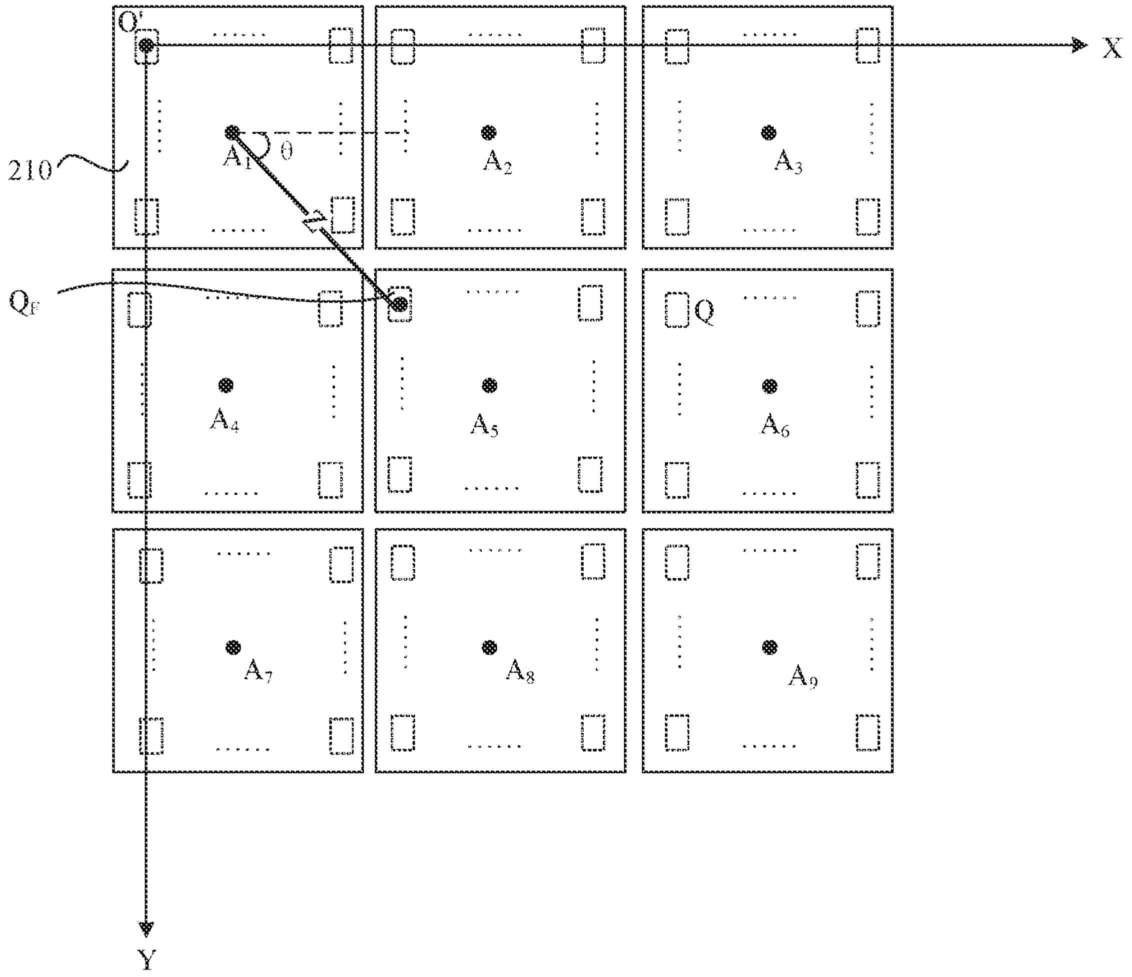
FIG. 10B is a diagram illustrating a process of determining relative positional relationships between a first pixel and reference points of at least two first backlight units, in accordance with some other embodiments.

For example, in a case where the backlight unit 210 corresponding to the first pixel $Q_F$ and the eight adjacent backlight units 210 are arranged in an array of 3 rows and 3 columns, the reference point S of the backlight unit 210 is the center point O thereof, and each backlight unit 210 corresponds to 40 rows and 40 columns of pixels Q, referring to FIG. 10B, a coordinate system is established with a pixel Q in a first row and a first column corresponding to the backlight unit $A_1$ as a coordinate origin (O'), a row direction of the pixels Q as a horizontal axis, and a column direction of the pixels Q as a vertical axis. In this case, coordinates of a position where a center point of the backlight unit $A_1$ is projected onto the display panel 100 are (20.5+0×40, 20.5+0×40); coordinates of a position where a center point of the backlight unit $A_2$ is projected onto the display panel 100 are (20.5+1×40, 20.5+0×40); coordinates of a position where a center point of the backlight unit $A_3$ is projected onto the display panel 100 are (20.5+2×40, 20.5+0×40); coordinates of a position where a center point of the backlight unit $A_4$ is projected onto the display panel 100 are (20.5+0×40, 20.5+1×40); coordinates of a position where a center point of the backlight unit $A_5$ is projected onto the display panel 100 are (20.5+1×40, 20.5+1×40); coordinates of a position where a center point of the backlight unit $A_6$ is projected onto the display panel 100 are (20.5+2×40, 20.5+1×40); coordinates of a position where a center point of the backlight unit $A_7$ is projected onto the display panel 100 are (20.5+0×40, 20.5+2×40); coordinates of a position where a center point of the backlight unit $A_8$ is projected onto the display panel 100 are (20.5+1×40, 20.5+2×40); coordinates of a position where a center point of the backlight unit $A_9$ is projected onto the display panel 100 are (20.5+2×40, 20.5+2×40); and coordinates of the first pixel $Q_F$ are ($X_Q$, $Y_Q$). In this case, the reference distances Z and the reference angles θ may be determined according to the above formulas.

In S104, an optical diffusion coefficient of each first backlight unit 211 at the corresponding position of the first pixel $Q_F$ is determined according to the relative positional relationships.

A correspondence (e.g., a function or a list) of a distance F, an included angle α and an optical diffusion coefficient may be pre-configured in the data processing device 300. In S104, the optical diffusion coefficient of each first backlight unit 211 at the corresponding position of the first pixel $Q_F$ may be determined according to the relative positional relationships obtained in S103 and the correspondence.

For example, in the case where backlight units 210 are arranged in an array, referring to FIG. 12, a coordinate system is established with the center point O of the backlight unit 210 as a coordinate origin, the row direction of the backlight units 210 as a horizontal axis, and the column direction of the backlight units 210 as a vertical axis. A brightness value of each coordinate point T in the coordinate system is obtained through measurement, and a distance F between each coordinate point T and the coordinate origin O, as well as an included angle α between a line connecting each coordinate point T with the coordinate origin O and the horizontal axis are recorded. The optical diffusion coefficient of the backlight unit 210 is obtained according to the brightness value of each coordinate point and a brightness value of the coordinate origin. In this way, a correspondence list of the distance F, the included angle α and the optical diffusion coefficient may be obtained. The optical diffusion coefficient may be a ratio of the brightness value of each coordinate point T to the brightness value of the coordinate origin O. The coordinate origin O is a position where the backlight unit 210 has a maximum brightness value.

For example, the brightness value may be obtained through measurement with an optical instrument such as a brightness meter.

As shown in FIG. 12, in a case where the backlight unit 210 is provided with four light-emitting devices D1 to D4, light emitted by the backlight unit 210 diffuses around in a petal shape. The four light-emitting devices D1 to D4 are located in four quadrants of the coordinate system, and distances between coordinate points where the four light-emitting devices D1 to D4 are located and the horizontal axis are same, and distances between the four coordinate points and the vertical axis are same. In this case, since the four light-emitting devices D1 to D4 are symmetrically distributed in the coordinate system, optical diffusion situations in the four quadrants are same. In this case, an optical diffusion coefficient of only one quadrant needs to be measured, so that workload of the measurement may be reduced, and working efficiency may be improved.

It will be noted that, discretization may be performed on the distance F and the included angle $\alpha$ corresponding to each coordinate point by means of a discretization model. For example, in a case where the optical diffusion situations in the four quadrants are same, the included angle may continuously take values in a range of [1°, 90° ] with a step of 1° during the discretization. A coding space required during the discretization is not limited in the present disclosure, which may be selected according to actual situations. For example, in a case where the included angle continuously takes values in the range of [1°, 90° ] with the step of 1° during the discretization, since $2^7$ is equal to 128 and 128 is greater than 90, a 7 bit coding space may be used for the discretization of the included angle. In addition, a value range of the distance and a step size are not limited in the embodiments of the present disclosure, which may be set according to actual situations. For example, in a case where a brightness value at each position within the value range of the distance is greater than or equal to 10% of the brightness value at the center point of the backlight unit 210, an 8 bit coding space may be used for the discretization of the distance.

Based on this, in a case where the relative positional relationships between the first pixel $Q_F$ and the reference points S of the at least two first backlight units 211 are obtained, and the relative positional relationships each include the reference distance Z and the reference angle $\theta$, the optical diffusion coefficient of the first backlight unit 211 at the reference distance Z and the reference angle $\theta$ may be obtained according to the reference distance Z and the reference angle $\theta$, and by, for example, searching the correspondence list of the distance F, the included angle $\alpha$ and the optical diffusion coefficient.

It will be noted that, the method for establishing the coordinate system in a process of obtaining the relative positional relationships between the first pixel $Q_F$ and the reference points S of the at least two first backlight units 211, is same as that in a process of obtaining the optical diffusion coefficient.

In S105, the backlight brightness characteristic value of the first pixel $Q_F$ is determined according to a brightness control value of each first backlight unit 211 and the optical diffusion coefficient of each first backlight unit 211 at the corresponding position of the first pixel $Q_F$.

The corresponding position of the first pixel $Q_F$ is the position where the first pixel $Q_F$ is orthogonally projected onto the backlight module 200.

It will be noted that, in a case where the first pixel $Q_F$ includes one pixel Q, a corresponding position of the pixel Q is taken as the corresponding position of the first pixel $Q_F$. In a case where first pixels $Q_F$ include at least two pixels Q, a corresponding position of one of the pixels Q may be taken as the corresponding position of the first pixel $Q_F$, or, a center of a region where the pixels Q are located may be taken as the corresponding position of the first pixel $Q_F$.

In addition, the backlight brightness characteristic value of the first pixel $Q_F$ may be a unitless value, and a magnitude of the value represents only a magnitude of a relative brightness at the corresponding position of the first pixel $Q_F$. Alternatively, the backlight brightness characteristic value of the first pixel $Q_F$ may be used to control a magnitude of a driving current. That is, the backlight brightness characteristic value may be regarded as a backlight driving value. Alternatively, the backlight brightness characteristic value of the first pixel $Q_F$ may be an actual brightness of the backlight unit 210.

Figure 13:
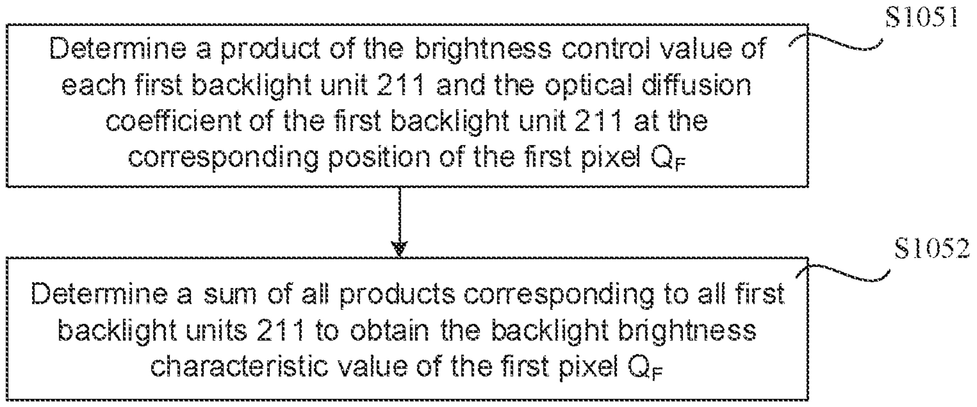
FIG. 13 is a flow diagram of yet another data processing method, in accordance with some embodiments.

For example, determining the backlight brightness characteristic value of the first pixel $Q_F$ according to the brightness control value of each first backlight unit 211 and the optical diffusion coefficient of each first backlight unit 211 at the corresponding position of the first pixel $Q_F$, as shown in FIG. 13, includes the following steps.

In S1051, a product of the brightness control value of each first backlight unit 211 and the optical diffusion coefficient of the first backlight unit 211 at the corresponding position of the first pixel $Q_F$ is determined.

In S1052, a sum of all products corresponding to all first backlight units 211 is determined to obtain the backlight brightness characteristic value of the first pixel $Q_F$.

For example, referring to FIG. 10A, in the array of 3 rows and 3 columns formed by the backlight unit 210 corresponding to the first pixel $Q_F$ and the eight adjacent backlight units 210, brightness control values of the first backlight unit to the ninth backlight unit are respectively $B_1$ to $B_9$, and optical diffusion coefficients thereof are respectively $\Delta_1$ to $\Delta_9$. In this case, the backlight brightness characteristic value $BL_F$ of the first pixel $Q_F$ is determined according to the following formula: $BL_F=(B_1\times\Delta_1+B_2\times\Delta_a+B_3\times\Delta_3+ \ldots +B_9\times\Delta_6)$. In this case, the backlight brightness characteristic value may be regarded as the backlight driving value. According to the above formula for converting a backlight driving value into a driving current, a driving current corresponding to the backlight brightness characteristic value may be obtained as the driving current corresponding to the first pixel $Q_F$.

In summary, in the data processing method provided in the embodiments of the present disclosure, the brightness control value of each backlight unit 210 is obtained according to the first pixel values of the pixels Q corresponding to the backlight unit 210; the optical diffusion coefficient of each first backlight unit 211 at the corresponding position of the first pixel $Q_F$ is determined according to the relative positional relationships between the first pixel $Q_F$ and the reference points S of the at least two first backlight units 211; and the backlight brightness characteristic value of the first pixel $Q_F$ is determined according to the brightness control value of each first backlight unit 211 and the optical diffusion coefficient of each first backlight unit at the corresponding position of the first pixel $Q_F$. In this case, the backlight brightness characteristic value of the first pixel $Q_F$ is related to the brightness control value of each first backlight unit 211 and the optical diffusion coefficient of each first backlight unit 211 at the corresponding position of the first pixel $Q_F$, and the backlight brightness characteristic value of the first pixel $Q_F$ reflects an optical diffusion situation of each first backlight unit 211 at the corresponding position of the first pixel $Q_F$. Therefore, during display of the display apparatus 400, the backlight module 200 may adjust a light-emitting situation at the corresponding position of the first pixel $Q_F$ according to the backlight brightness characteristic value. Consequently, it is possible to avoid crosstalk between light emitted by the first backlight units 211 at the corresponding position of the first pixel $Q_F$, and the display effect of the display apparatus 400 may be improved.

Figure 14:
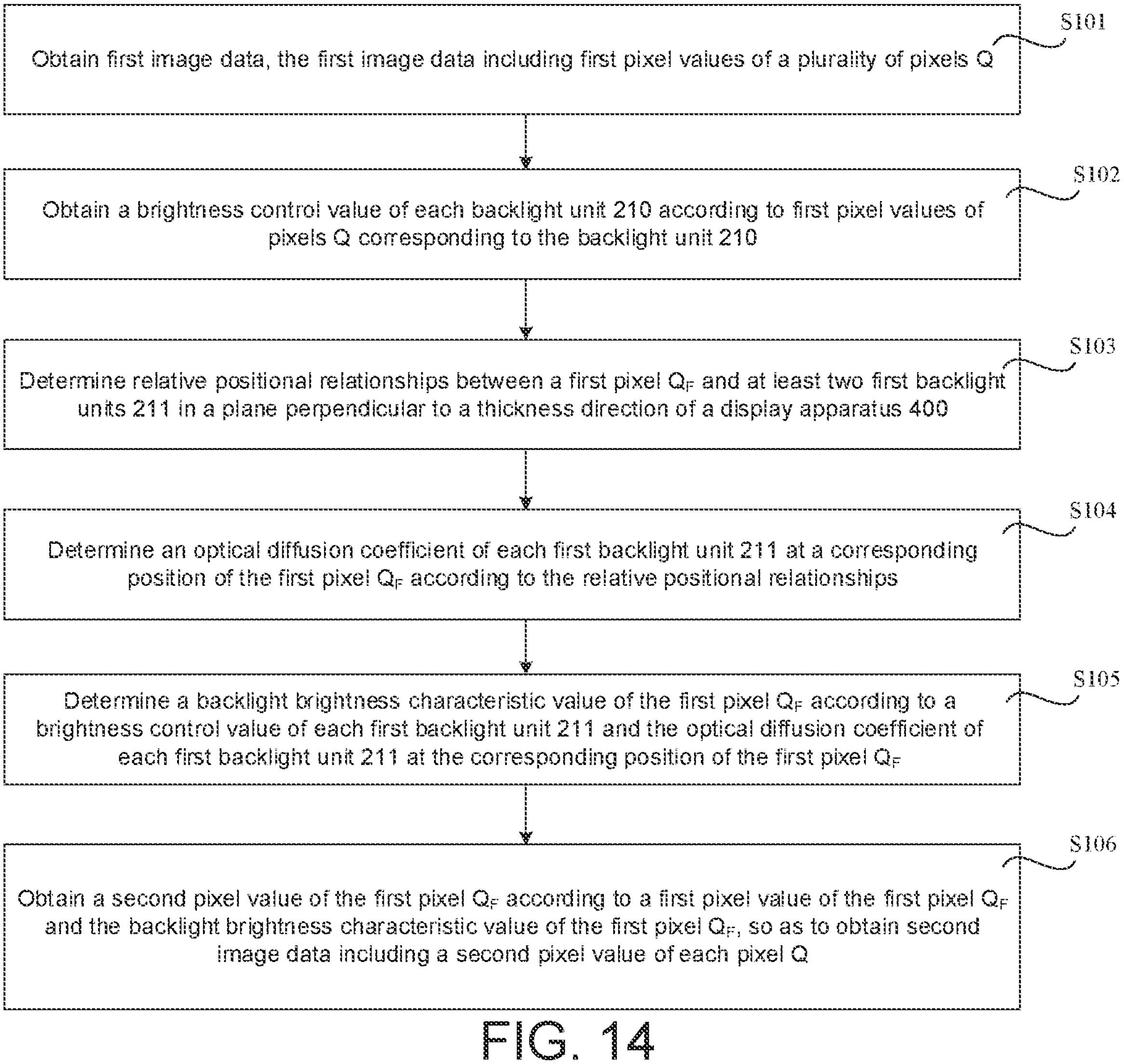
FIG. 14 is a flow diagram of yet another data processing method, in accordance with some embodiments.

In some embodiments, as shown in FIG. 14, the data processing method further includes the following steps.

In S106, a second pixel value of the first pixel $Q_F$ is obtained according to a first pixel value of the first pixel $Q_F$ and the backlight brightness characteristic value of the first pixel $Q_F$, so as to obtain the second image data including a second pixel value of each pixel Q.

In this case, the gray level of each sub-pixel may be obtained according to the second pixel value of each pixel Q in the display panel 100. For example, the gray level R of the red sub-pixel, the gray level G of the green sub-pixel and the gray level B of the blue sub-pixel in each pixel Q may be obtained according to the second pixel value of each pixel Q in the display panel 100. In this case, the second image data includes the gray level of each sub-pixel in each pixel Q.

It can be understood that, the backlight brightness characteristic value of the first pixel $Q_F$ is related to the brightness control value of each first backlight unit 211 and the optical diffusion coefficient of each first backlight unit 211 at the corresponding position of the first pixel $Q_F$; therefore, the first pixel value of the first pixel $Q_F$ may be compensated according to the optical diffusion situation of each first backlight unit 211 at the corresponding position of the first pixel $Q_F$, so as to obtain a second pixel value of the first pixel $Q_F$. As a result, it is possible to avoid interference with normal light emission at the corresponding position of the first pixel $Q_F$ caused by superposition of brightnesses of the first backlight units 211 at the corresponding position of the first pixel $Q_F$. In addition, a normal display effect of the display apparatus 400 may be ensured during the display of the display panel 100 according to the second image data.

Figure 15:
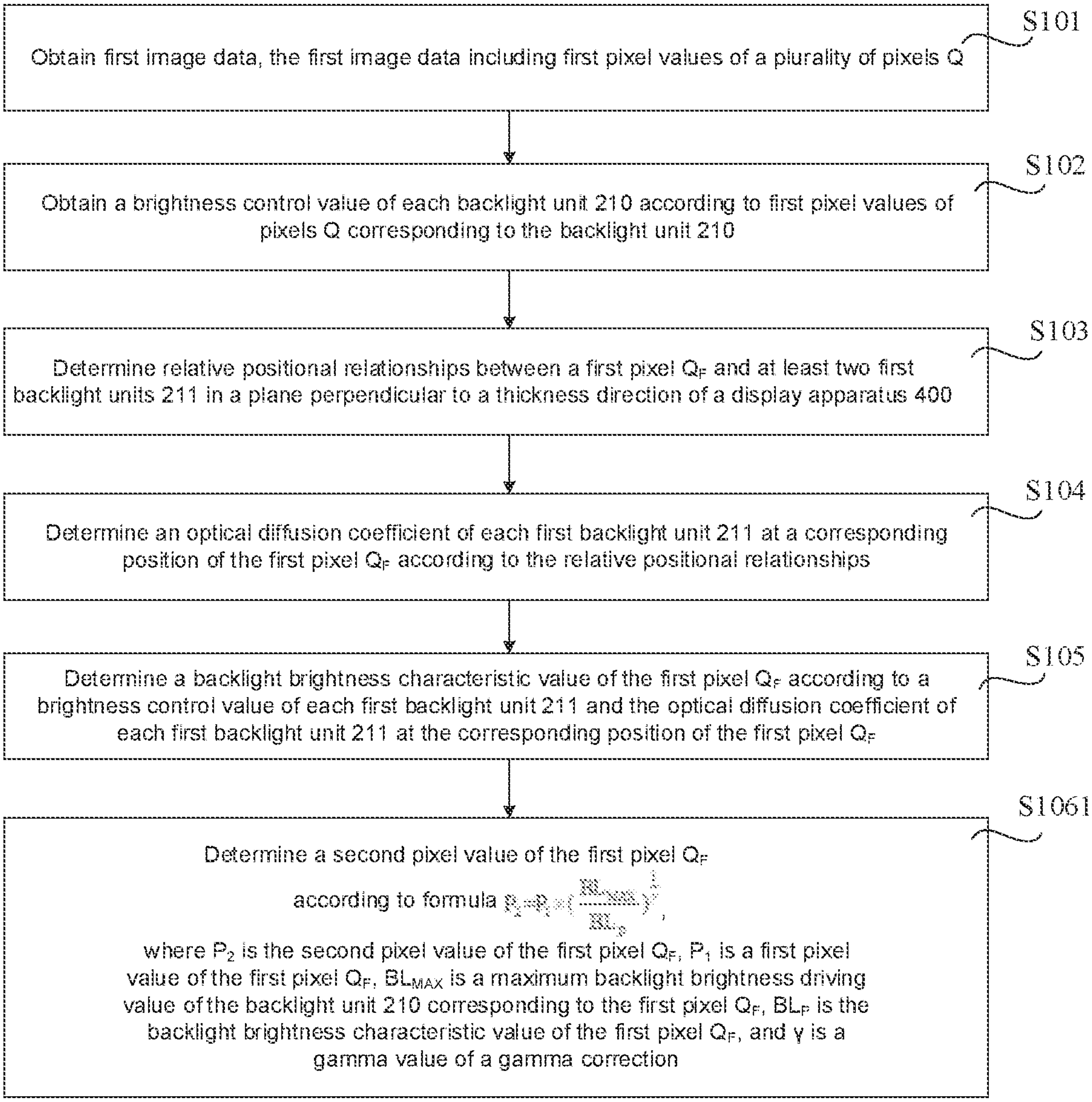
FIG. 15 is a flow diagram of yet another data processing method, in accordance with some embodiments.

For example, obtaining the second pixel value of the first pixel $Q_F$ according to the first pixel value of the first pixel $Q_F$ and the backlight brightness characteristic value of the first pixel $Q_F$, as shown in FIG. 15, includes the following steps.

In S1061, the second pixel value of the first pixel $Q_F$ is determined according to formula $$P_2 = P_1 \times \left(\frac{BL_{MAX}}{BL_P}\right)^{\frac{1}{\gamma}},$$

where $P_2$ is the second pixel value of the first pixel $Q_F$, $P_1$ is the first pixel value of the first pixel $Q_F$, $BL_{MAX}$ is a maximum backlight brightness driving value of the backlight unit 210 corresponding to the first pixel $Q_F$, $BL_P$ is the backlight brightness characteristic value of the first pixel $Q_F$, and $\gamma$ is the gamma value of the gamma correction.

For example, the backlight driving value corresponding to the maximum brightness of the display apparatus 400 may be taken as the maximum backlight brightness driving value $BL_{MAX}$ of the backlight unit 210 corresponding to the first pixel OF. For example, the backlight driving value corresponding to the maximum brightness (e.g., 1000 nit) of the display apparatus 400 obtained by adjusting the brightness of each backlight unit 210 in the case where the maximum value of the brightness Y' is 255, is taken as the maximum backlight brightness driving value $BL_{MAX}$ of the backlight unit 210 corresponding to the first pixel $Q_F$. The maximum backlight brightness driving value $BL_{MAX}$ is in a linear relationship with the driving current, and the driving current is in an approximate linear relationship with the brightness. For example, referring to FIG. 4, in a case where a distance between at least two pixels Q is relatively small, optical diffusion coefficients of each backlight unit 210 at positions of the at least two pixels Q may be approximately equal, and backlight brightness characteristic values corresponding to the at least two pixels Q may also be approximately equal. In this case, in a process of obtaining the backlight brightness characteristic values of the at least two pixels Q, a backlight brightness characteristic value of only one of the at least two pixels Q may be determined, thereby simplifying the calculation. In this case, a backlight brightness characteristic value of a first pixel $Q_1$ in the at least two pixels is $BL_P$, and a backlight brightness characteristic value of a second pixel $Q_2$ in the at least two pixels is also $BL_P$; and a second pixel value of the first pixel $Q_1$ is $$P_{Q1-2} = P_{Q1-1} \times \left(\frac{BL_{MAX}}{BL_P}\right)^{\frac{1}{\gamma}},$$

and a second pixel value of the second pixel $Q_2$ is $$P_{Q2-2} = P_{Q2-1} \times \left(\frac{BL_{MAX}}{BL_P}\right)^{\frac{1}{\gamma}},$$

where $P_{Q1-1}$ is a first pixel value of the first pixel $Q_1$, and $P_{Q2-1}$ is a first pixel value of the second pixel $Q_2$.

It will be noted that, $\gamma$ is the gamma value during the gamma correction on the third image data. For example, a value of $\gamma$ may be 2.4.

For example, in a case where a maximum first pixel value of the display apparatus 400 is 255 (e.g., Y'=255), a brightness of the first pixel $Q_F$ corresponding to the first pixel value is $$L_1 = \left(\frac{P_1}{255}\right)^{\gamma} \times BL_{MAX},$$

and a brightness of the first pixel $Q_F$ corresponding to the second pixel value is $$L_2 = \left(\frac{P_2}{255}\right)^{\gamma} \times BL_P.$$

The backlight driving value is in a linear relationship with the driving current, and the driving current is in a linear relationship with the brightness. Therefore, for convenience of description, $BL_{MAX}$ in the formula may be taken as a display brightness corresponding to the maximum backlight brightness driving value of the backlight unit 210 corresponding to the first pixel $Q_F$, and $BL_P$ in the formula may be taken as a display brightness corresponding to a backlight brightness characteristic value of the first pixel $Q_F$. In a case of ensuring that a display brightness corresponding to input image data (i.e., the first image data) is equal to a display brightness corresponding to output image data (i.e., the second image data), $L_1$ is equal to $L_2$ ($L_1=L_2$), i.e., $$\left(\frac{P_1}{255}\right)^{\gamma} \times BL_{MAX} = \left(\frac{P_2}{255}\right)^{\gamma} \times BL_P.$$

Thus, the second pixel value $P_2$ of the first pixel $Q_F$ may be obtained according to formula $$P_2 = P_1 \times \left(\frac{BL_{MAX}}{BL_P}\right)^{\frac{1}{\gamma}}.$$

Figure 16:
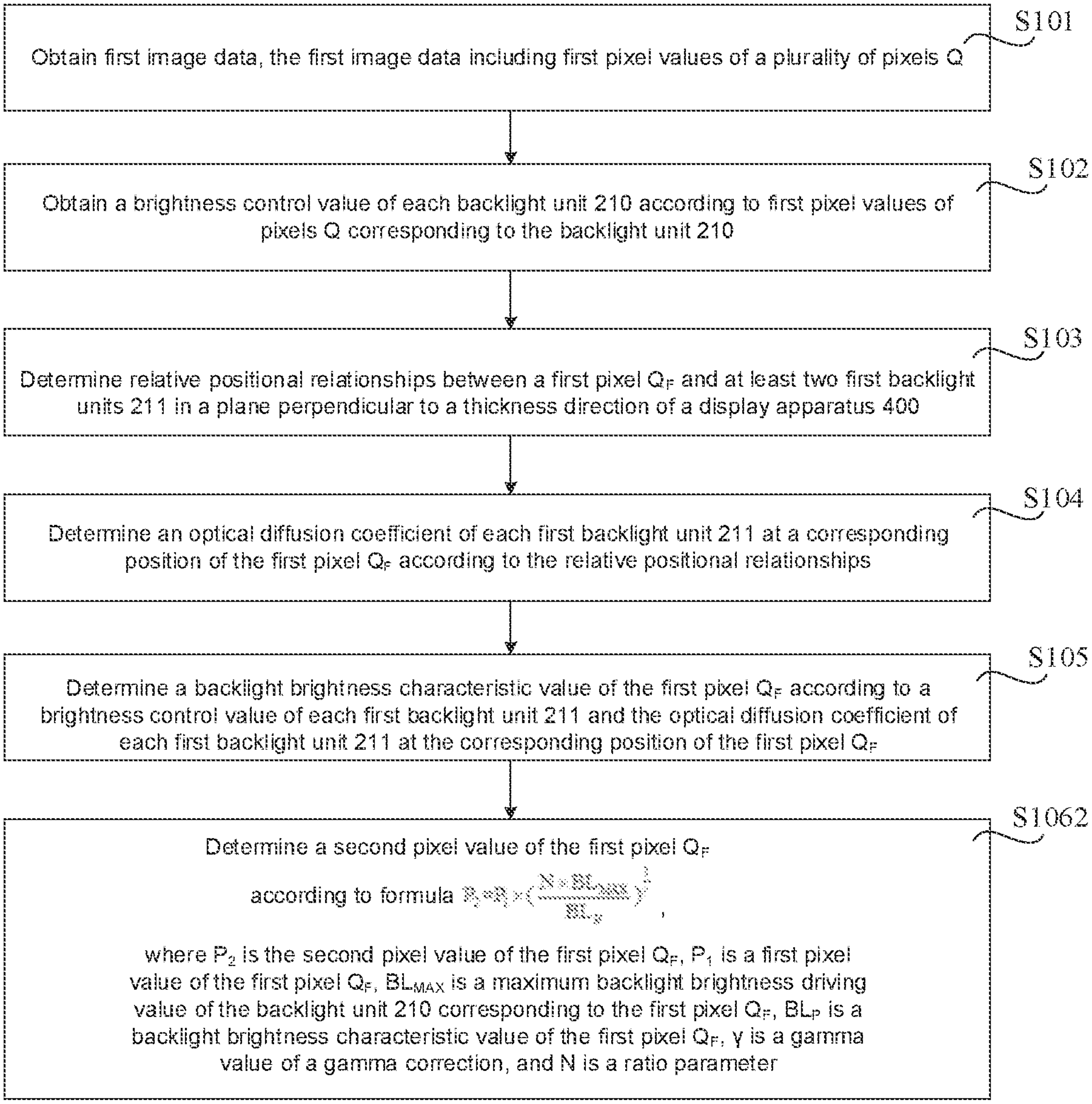
FIG. 16 is a flow diagram of yet another data processing method, in accordance with some embodiments.

For another example, obtaining the second pixel value of the first pixel $Q_F$ according to the first pixel value of the first pixel $Q_F$ and the backlight brightness characteristic value of the first pixel $Q_F$, as shown in FIG. 16, includes the following steps.

In S1062, the second pixel value of the first pixel $Q_F$ is determined according to formula $$P_2 = P_1 \times \left(\frac{N \times BL_{MAX}}{BL_P}\right)^{\frac{1}{\gamma}},$$

where $P_2$ is the second pixel value of the first pixel $Q_F$, $P_1$ is the first pixel value of the first pixel $Q_F$, $BL_{MAX}$ is the maximum backlight brightness driving value of the backlight unit 210 corresponding to the first pixel $Q_F$, $BL_P$ is the backlight brightness characteristic value of the first pixel $Q_F$, $\gamma$ is the gamma value of the gamma correction, and N is a ratio parameter.

For example, referring to FIG. 10A, maximum backlight driving values of the nine first backlight units 211 are respectively $B_{1\_M}$ to $B_{9\_M}$, and optical diffusion coefficients thereof at the corresponding position of the first pixel $Q_F$ are respectively $\Delta_1$ to $\Delta_9$. In this case, $N \times BL_{MAX}=(B_{1\_M}\times\Delta_1+B_{2\_M}\times\Delta_2+B_{3\_M}\times\Delta_3++B_{9\_M}\times\Delta_9)$. The maximum backlight driving value of each first backlight unit 211 is equal to the maximum backlight brightness driving value $BL_{MAX}$ of the backlight unit 210 corresponding to the first pixel $Q_F$. Therefore, $N \times BL_{MAX}=(\Delta_1+\Delta_2+\Delta_3+ \ldots +\Delta_9)\times BL_{MAX}$, i.e., $N=(\Delta_1+\Delta_2+\Delta_3+ \ldots +\Delta_9)$. The ratio parameter N is a sum of the optical diffusion coefficients of the first backlight units 211 at the corresponding position of the first pixel $Q_F$. For example, N is greater than or equal to 1. For example, the backlight driving value corresponding to the maximum brightness of the display apparatus 400 may be taken as the maximum backlight brightness driving value $BL_{MAX}$ of the backlight unit 210 corresponding to the first pixel $Q_F$.

Figure 17:
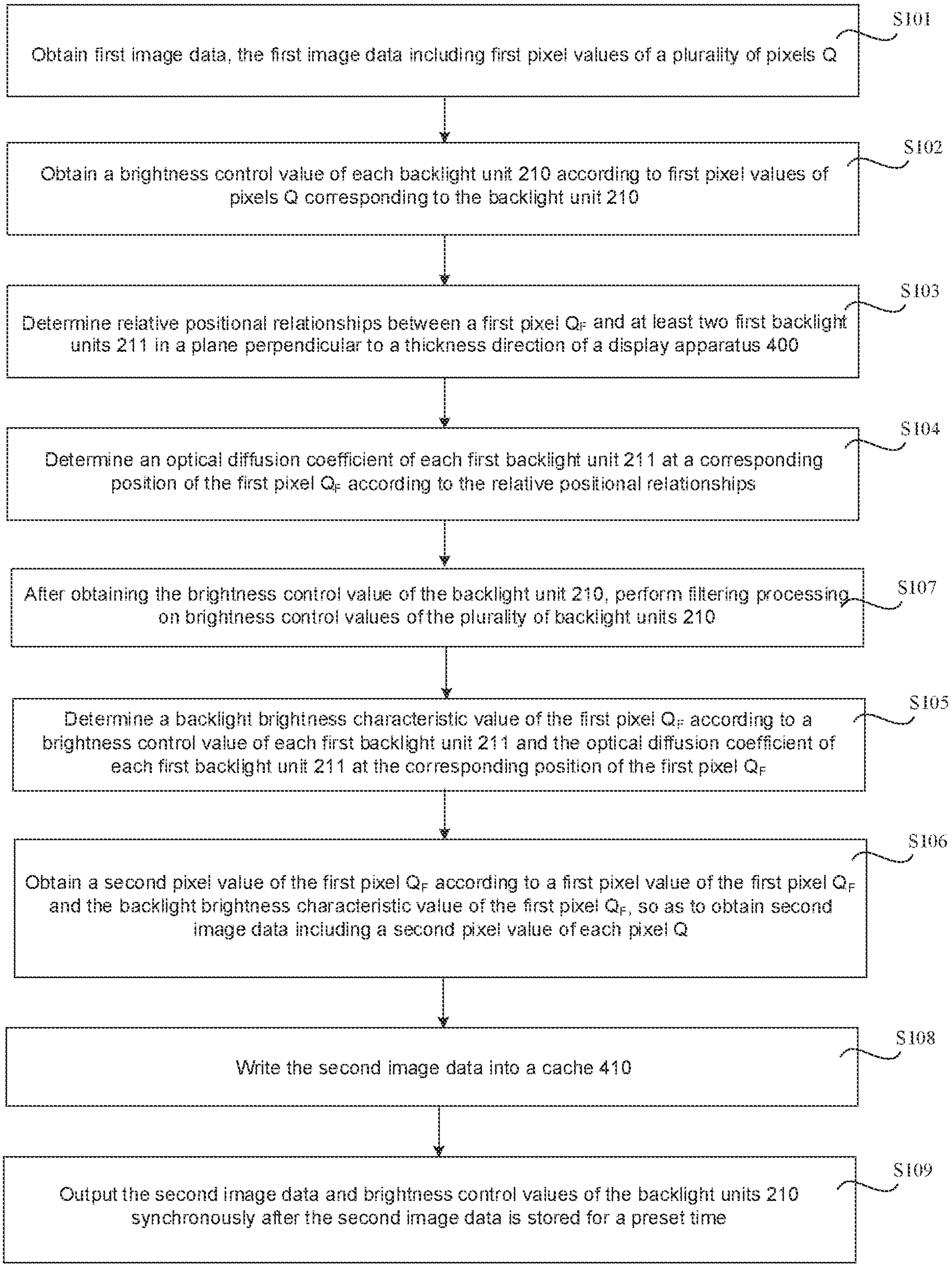
FIG. 17 is a flow diagram of yet another data processing method, in accordance with some embodiments.

In some embodiments, as shown in FIG. 17, before the backlight brightness characteristic value of the first pixel $Q_F$ is determined, the data processing method further includes the following steps.

In S107, after obtaining the brightness control value of the backlight unit 210, filtering processing is performed on brightness control values of the plurality of backlight units 210.

In this way, it is possible to avoid affecting uniformity of light emitted by the backlight module 200 due to an excessively large difference between the brightness control values of the backlight units 210. As a result, a variation trend of the brightness control values of the backlight units 210 is smooth, and in turn, in a case where the filtered brightness control values are transmitted to the backlight module 200, the uniformity of the emitted light may be improved.

In some embodiments, as shown in FIG. 17, the data processing method further includes the following steps.

In S108, the second image data is written into the cache 410.

In S109, the second image data and the brightness control values of the backlight units 210 are synchronously output after the second image data is stored for a preset time.

The second image data is output to the display panel 100, and the brightness control values of the backlight units 210 are output to the backlight module 200.

In this case, the second image data is output earlier than the brightness control values of the backlight units 210, and a transmission speed of the brightness control values of the backlight units 210 is relatively slow. Therefore, the second image data is stored for the preset time, and then the second image data and the brightness control values of the backlight units 210 are output synchronously, which may prevent interframe crosstalk from occurring during operation of the display panel and the backlight module due to the earlier output of the second image data than the brightness control values of the backlight units 210. As a result, the display effect may be improved.

It will be noted that, the preset time is a time period from a moment when the second image data is written into the cache to a moment when the brightness control values of the backlight units 210 start to be output to the backlight module 200. For example, the brightness control values of the backlight units 210 are output only after a frame of second image data is output, and transmission time of the brightness control values of the backlight units 210 is a frame period. In this case, the brightness control values of the backlight units 210 lags behind the second image data by two frame periods, and thus the second image data needs to be stored for two frame periods and then output.

In addition, in a case where the filtering processing is performed on the brightness control values, the second image data, after being stored for the preset time, is output synchronously with the filtered brightness control values of the backlight units 210.

Figure 19:
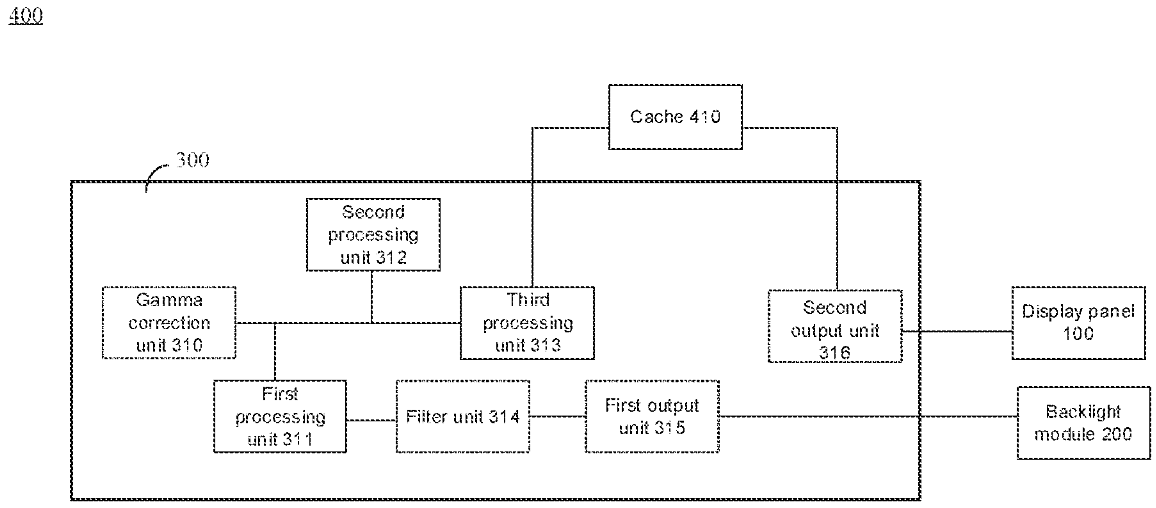
FIG. 19 is a structural diagram of yet another display apparatus, in accordance with some embodiments.

Some embodiments of the present disclosure provide a data processing device 300. As shown in FIG. 19, the data processing device 300 is applied to the display apparatus 400.

As shown in FIG. 19, the data processing device 300 includes a first processing unit 311, a second processing unit 312 and a third processing unit 313. The third processing unit 313 is coupled to the first processing unit 311 and the second processing unit 312.

The first processing unit 311 is configured to: obtain the first image data, the first image data including first pixel values of the plurality of pixels Q; and obtain the brightness control value of each backlight unit 210 according to the first pixel values of the pixels Q corresponding to the backlight unit 210.

The second processing unit 312 is configured to: determine the relative positional relationships between a first pixel $Q_F$ and the reference points of the at least two first backlight units 211 in the plane perpendicular to the thickness direction of the display apparatus 400; and determine the optical diffusion coefficient of each first backlight unit 211 at the corresponding position of the first pixel $Q_F$ according to the relative positional relationships. The first pixel $Q_F$ is any pixel Q of the plurality of pixels Q, and the at least two first backlight units 211 include the backlight unit 210 corresponding to the first pixel $Q_F$ and the at least one backlight unit 210 adjacent thereto, and the backlight unit 210 corresponding to the first pixel $Q_F$ and the at least one backlight unit 210 adjacent thereto are arranged consecutively.

The third processing unit 313 is configured to determine the backlight brightness characteristic value of the first pixel $Q_F$ according to the brightness control value of each first backlight unit 211 and the optical diffusion coefficient of each first backlight unit 211 at the corresponding position of the first pixel $Q_F$.

The corresponding position of the first pixel $Q_F$ is the position where the first pixel $Q_F$ is orthogonally projected onto the backlight module 200.

In some embodiments, as shown in FIG. 19, the third processing unit 313 is further configured to obtain the second pixel value of the first pixel $Q_F$ according to the first pixel value of the first pixel $Q_F$ and the backlight brightness characteristic value of the first pixel $Q_F$, so as to obtain the second image data including the second pixel value of each pixel Q.

In some embodiments, as shown in FIG. 19, the data processing device 300 further includes a gamma correction unit 310. The gamma correction unit 310 is coupled to the first processing unit 311 and the third processing unit 313.

The gamma correction unit 310 is configured to receive the third image data, and perform gamma correction on the third image data to obtain the first image data.

In some embodiments, as shown in FIG. 19, the data processing device 300 further includes a filter unit 314. The filter unit 314 is coupled to the first processing unit 311.

The filter unit 314 is configured to perform filtering processing on brightness control values of the plurality of backlight units 210 after obtaining the brightness control values of the backlight units 210.

In some embodiments, as shown in FIG. 19, in a case where the display apparatus 400 includes a cache 410, the third processing unit 313 is further coupled to the cache 410.

The data processing device 300 further includes a first output unit 315 and a second output unit 316. The first output unit 315 is coupled to the first processing unit 311. The second output unit 316 is coupled to the cache 410.

The third processing unit 313 is further configured to write the second image data into the cache 410.

The first output unit 315 is configured to output the brightness control values of the backlight units 210.

The second output unit 316 is configured to output the second image data stored in the cache 410 after the second image data is stored for a preset time, so that the second image data is output synchronously with the brightness control values of the backlight units 210.

It can be understood that, the first output unit 315 is coupled to the backlight module 200, and the first output unit 315 is used to output the brightness control values of the backlight units 210 to the backlight module 200. The second output unit 316 is coupled to the display panel 100, and the second output unit 316 is used to output the second image data to the display panel 100.

The embodiments of the device described in FIG. 19 are merely illustrative. For example, division of the above units is merely a logical function division, and there may be other division manners in actual implementation. For example, a plurality of modules or components may be combined or integrated into another system, or some features may be omitted or not executed. The functional units in the embodiments of the present disclosure may be integrated into a single processing module or may be separate physical units, or two or more units may be integrated into a single module. The above units in FIG. 19 may be implemented in the form of hardware or software functional units. For example, when implemented by software, the first processing unit 311, the second processing unit 312, the third processing unit 313 and the like may be implemented by software functional modules generated after at least one processor reads program code stored in a memory. The above units in FIG. 19 may also be implemented by different hardware in a computer (e.g., the display apparatus). For example, the first processing unit 311, the second processing unit 312, the third processing unit 313, the gamma correction unit 310, the filter unit 314, the first output unit 315 and the second output unit 316 are implemented by a part of processing resources in at least one processor (e.g., one core or two cores in a multi-core processor), while the gamma correction unit 310, the filter unit 314, the first output unit 315 and the second output unit 316 are implemented by a remaining part of processing resources in the at least one processor (e.g., other cores in the multi-core processor). For example, when the above units are implemented in the form of hardware, for example, the data processing device 300 may be a programmable device, such as a hardware programmable device, such as an FPGA. In this case, the first processing unit 311, the second processing unit 312, the third processing 313, the gamma correction unit 310, the filter unit 314 and the like in the data processing device 300 may each include a configurable logic block (CLB), and different units are coupled through internal connection lines. Obviously, the above functional units may also be implemented by means of a combination of software and hardware. For example, the gamma correction unit 310, the filter unit 314, the first output unit 315 and the second output unit 316 are implemented by hardware circuits, while the first processing unit 311, the second processing unit 312 and the third processing unit 313 are implemented by software functional modules generated after a CPU reads the program code stored in the memory.

For more details of the first processing unit 311, the second processing unit 312, the third processing unit 313, the gamma correction unit 310, the filter unit 314, the first output unit 315 and the second output unit 316 in FIG. 19 implementing the above functions, reference may be made to the description of the method in the embodiments, and details will not be repeated here.

The embodiments in the present description are all described in an incremental manner. For same and similar parts between the embodiments, reference may be made to each other. Each embodiment focuses on differences between the embodiment and other embodiments.

The above embodiments may be implemented in whole or in part through software, hardware, firmware, or any combination thereof. When the above embodiments are implemented by using a software program, the software program may be implemented in a form of a computer program product in whole or in part. The computer program product includes one or more computer programs. When the computer program(s) are loaded on and executed by a computer, processes or functions according to the embodiments of the present application are generated in whole or in part. The computer may be a general-purpose computer, a dedicated computer, a computer network, or any other programmable device. The computer program(s) may be stored in a computer-readable storage medium. The computer-readable storage medium may be any available medium that may be accessed by the computer, or a data storage device, such as a server including one or more available media or a data center including one or more available media. The available medium may be a magnetic medium (e.g., a floppy disk, a magnetic disk or a magnetic tape), an optical medium (e.g., a digital versatile disk (DVD)), a semiconductor medium (e.g., a solid state drive (SSD)), or the like.

It will be noted that, beneficial effects of the data processing device 300 are same as those of the data processing method described in the embodiments described above, and details will not be repeated here.

Some embodiments of the present disclosure provide a computer-readable storage medium (e.g., a non-transitory computer-readable storage medium). The computer-readable storage medium has stored thereon computer programs that, when executed by a computer, cause the computer to perform the data processing method as described in any one of the above embodiments.

For example, the computer-readable storage medium may include, but is not limited to, a magnetic storage device (e.g., a hard disk, a floppy disk or a magnetic tape), an optical disk (e.g., a compact disk (CD), or a DVD), a smart card, a flash memory device (e.g., an erasable programmable read-only memory (EPROM)), a card, a stick or a key driver. Various computer-readable storage media described in the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure provide a computer program product. The computer program product includes computer programs that, when executed by a computer, cause the computer to perform the data processing method described in the above embodiments.

It will be noted that, the computer programs in the embodiments of the present disclosure may also be referred to as application code, which is not specifically limited in the embodiments of the present disclosure.

Some embodiments of the present disclosure provide a computer program. When executed by a computer, the computer program causes the computer to perform the data processing method as described in the above embodiments.

The computer may be the display apparatus 400.

Beneficial effects of the computer-readable storage medium, the computer program product and the computer program are same as those of the data processing method described in the embodiments described above, and details will not be repeated here.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A data processing method applied to a display apparatus, wherein the display apparatus includes a display panel and a backlight module disposed opposite to each other, the display panel includes a plurality of pixels, the backlight module has a plurality of backlight units, and each backlight unit corresponds to at least two pixels; the data processing method comprising:

obtaining first image data, the first image data including first pixel values of the plurality of pixels;

obtaining a brightness control value of each backlight unit according to first pixel values of pixels corresponding to the backlight unit;

determining relative positional relationships between a first pixel and at least two first backlight units in a plane perpendicular to a thickness direction of the display apparatus, wherein the relative positional relationships each include a reference distance and a reference angle, the first pixel is any pixel of the plurality of pixels, the at least two first backlight units include a backlight unit corresponding to the first pixel and at least one backlight unit adjacent thereto, and the backlight unit corresponding to the first pixel and the at least one backlight unit adjacent thereto are arranged consecutively, the at least two first backlight units overlap with a brightness diffusion region;

determining directly an optical diffusion coefficient of each first backlight unit at a corresponding position of the first pixel according to the relative positional relationships; and determining a backlight brightness characteristic value of the first pixel according to a brightness control value of each first backlight unit and the optical diffusion coefficient of each first backlight unit at the corresponding position of the first pixel;

wherein obtaining the brightness control value of each backlight unit according to the first pixel values of the pixels corresponding to the backlight unit includes:

determining J times an average pixel value of the backlight unit to obtain the brightness control value of the backlight unit, the average pixel value of the backlight unit being an average value of the first pixel values of the pixels corresponding to the backlight unit, and J being greater than 1 and less than or equal to 2;

wherein obtaining the first image data includes:

receiving third image data; and performing gamma correction on the third image data to obtain the first image data;

the data processing method further comprising:

obtaining a second pixel value of the first pixel according to a first pixel value of the first pixel and the backlight brightness characteristic value of the first pixel, including:

determining the second pixel value of the first pixel according to formula $$P_2 = P_1 \times \left(\frac{BL_{MAX}}{BL_P}\right)^{\frac{1}{\gamma}},$$

wherein $P_2$ is the second pixel value of the first pixel, $P_1$ is the first pixel value of the first pixel, $BL_{MAX}$ is a maximum backlight brightness driving value of the backlight unit corresponding to the first pixel, N is a ratio parameter, N is greater than 1, $BL_P$ is the backlight brightness characteristic value of the first pixel, and $\gamma$ is a gamma value of the gamma correction.

2. The data processing method according to claim 1, further comprising:

obtaining a second pixel value of the first pixel according to a first pixel value of the first pixel and the backlight brightness characteristic value of the first pixel, so as to obtain second image data including a second pixel value of each pixel.

3. The data processing method according to claim 1, wherein determining the relative positional relationships between the first pixel and the at least two first backlight units in the plane perpendicular to the thickness direction of the display apparatus includes:

determining the reference distance, the reference distance being a distance between the corresponding position of the first pixel and a reference point of each first backlight unit; and determining the reference angle, the reference angle being an included angle between an extending direction of a line connecting the corresponding position of the first pixel with the reference point of the first backlight unit and a reference direction, and the reference direction being any direction within the plane perpendicular to the thickness direction of the display apparatus.

4. The data processing method according to claim 3, wherein the reference point of each first backlight unit is a center point thereof.

5. The data processing method according to claim 3, wherein the plurality of backlight units are arranged in an array, and the reference direction is a row direction of the first backlight units.

6. The data processing method according to claim 1, wherein determining the backlight brightness characteristic value of the first pixel according to the brightness control value of each first backlight unit and the optical diffusion coefficient of each first backlight unit at the corresponding position of the first pixel includes:

determining a product of the brightness control value of each first backlight unit and the optical diffusion coefficient of the first backlight unit at the corresponding position of the first pixel; and determining a sum of all products corresponding to all first backlight units to obtain the backlight brightness characteristic value of the first pixel.

7. The data processing method according to claim 1, wherein before determining the backlight brightness characteristic value of the first pixel, the data processing method further comprises:

after obtaining the brightness control value of the backlight unit, performing filtering processing on brightness control values of the plurality of backlight units.

8. The data processing method according to claim 2, further comprising:

writing the second image data into a cache; and outputting the second image data and brightness control values of the backlight units synchronously after the second image data is stored for a preset time.

9. A data processing device applied to a display apparatus, the data processing device comprising:

a memory having stored therein one or more computer programs; and a processor coupled to the memory, the processor being configured to execute the one or more computer programs to cause the display apparatus to perform the data processing method according to claim 1.

10. A data processing device, wherein the data processing device is a chip, and the chip is configured to perform the data processing method according to claim 1.

11. A display apparatus, comprising:

the display panel;

the backlight module disposed opposite to the display panel; and the data processing device according to claim 9;

wherein the data processing device is coupled to the display panel and the backlight module; and the data processing device is configured to:

transmit the brightness control value of each backlight unit to the backlight module; and obtain a second pixel value of the first pixel obtained according to a first pixel value of the first pixel and the backlight brightness characteristic value of the first pixel, so as to obtain second image data including a second pixel value of each first pixel, and transmit the second image data to the display panel.

12. The display apparatus according to claim 11, further comprising a cache coupled to the data processing device, wherein the cache is configured to store the second image data.

13. A non-transitory computer-readable storage medium having stored thereon computer programs, wherein when executed by a computer, the computer programs cause the computer to perform the data processing method according to claim 1.

14. A display apparatus, comprising:

the display panel;

the backlight module disposed opposite to the display panel; and the data processing device according to claim 10;

wherein the data processing device is coupled to the display panel and the backlight module; and the data processing device is configured to:

transmit the brightness control value of each backlight unit to the backlight module; and obtain a second pixel value of the first pixel obtained according to a first pixel value of the first pixel and the backlight brightness characteristic value of the first pixel, so as to obtain second image data including a second pixel value of each first pixel, and transmit the second image data to the display panel.

15. The display apparatus according to claim 11, wherein two or more light-emitting devices are provided in each backlight unit.

* * * * *